US011956607B2

(12) United States Patent
Kou et al.

(10) Patent No.: US 11,956,607 B2
(45) Date of Patent: Apr. 9, 2024

(54) METHOD AND APPARATUS FOR IMPROVING SOUND QUALITY OF SPEAKER

(71) Applicant: Huawei Technologies Co., Ltd., Shenzhen (CN)

(72) Inventors: Yiwei Kou, Hangzhou (CN); Peng Qin, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 134 days.

(21) Appl. No.: 17/698,684

(22) Filed: Mar. 18, 2022

(65) Prior Publication Data

US 2022/0225026 A1 Jul. 14, 2022

Related U.S. Application Data

(63) Continuation of application No. PCT/CN2020/110632, filed on Aug. 21, 2020.

(30) Foreign Application Priority Data

Sep. 18, 2019 (CN) ......................... 201910883760.4

(51) Int. Cl.

| | |
|---|---|
| ***H04R 3/04*** | (2006.01) |
| ***H04R 3/00*** | (2006.01) |
| ***H04R 29/00*** | (2006.01) |

(52) U.S. Cl.

CPC ............... *H04R 3/04* (2013.01); *H04R 3/002* (2013.01); *H04R 29/001* (2013.01)

(58) Field of Classification Search

CPC ......... H04R 3/04; H04R 3/002; H04R 29/001

USPC ........................................ 381/96, 93, 95, 83

See application file for complete search history.

(56) References Cited

U.S. PATENT DOCUMENTS

| | | | |
|---|---|---|---|
| 8,204,210 | B2 | 6/2012 | Van De Laar |
| 8,774,419 | B2 | 7/2014 | Risbo et al. |
| 9,226,071 | B2 | 12/2015 | Polleros |
| 10,341,768 | B2 | 7/2019 | Hu et al. |
| 2008/0189087 | A1 | 8/2008 | Klippel |
| 2014/0064502 | A1 | 3/2014 | Hoang Co Thuy |

(Continued)

FOREIGN PATENT DOCUMENTS

| | | |
|---|---|---|
| CN | 101247671 A | 8/2008 |
| CN | 105916079 A | 8/2016 |

(Continued)

OTHER PUBLICATIONS

"Sound system equipment—Electroacoustical transducers—Measurement of large signal parameters," Jan. 27, 2010, XP082032953, 28 pages.

*Primary Examiner* — Thjuan K Addy

(74) *Attorney, Agent, or Firm* — Conley Rose, P.C.

(57) ABSTRACT

A method includes: performing interpolation on a second nonlinear parameter of a speaker based on direct current resistance of the speaker to obtain a third nonlinear parameter of the speaker, where the second nonlinear parameter is a nonlinear parameter preconfigured in the speaker; performing signal compensation on a first input signal of the speaker based on the third nonlinear parameter to obtain a compensated first input signal; and performing filtering on the compensated first input signal to obtain an output signal of the speaker.

20 Claims, 11 Drawing Sheets

(56) References Cited

U.S. PATENT DOCUMENTS

| | | | | |
|---|---|---|---|---|
| 2015/0120630 | A1 | 4/2015 | Lu et al. | |
| 2015/0139429 | A1 | 5/2015 | Gautama | |
| 2015/0215704 | A1 | 7/2015 | Magrath et al. | |
| 2015/0230037 | A1 | 8/2015 | Gautama | |
| 2016/0157035 | A1 | 6/2016 | Russell et al. | |
| 2016/0241960 | A1 | 8/2016 | Cheng et al. | |
| 2016/0309274 | A1* | 10/2016 | Ma .......................... | H03F 3/185 |
| 2017/0353791 | A1 | 12/2017 | Hu et al. | |
| 2017/0353795 | A1 | 12/2017 | Hu et al. | |
| 2018/0160228 | A1 | 6/2018 | Hu et al. | |

FOREIGN PATENT DOCUMENTS

| | | | |
|---|---|---|---|
| CN | 106851514 | A | 6/2017 |
| CN | 107211218 | A | 9/2017 |
| CN | 107317559 | A | 11/2017 |
| CN | 108632708 | A | 10/2018 |
| CN | 109361997 | A | 2/2019 |
| CN | 109379678 | A | 2/2019 |
| CN | 110213708 | A | 9/2019 |
| CN | 110225433 | A | 9/2019 |
| EP | 3240302 | A1 | 11/2017 |
| JP | 2014050106 | A | 3/2014 |

* cited by examiner

METHOD AND APPARATUS FOR IMPROVING SOUND QUALITY OF SPEAKER

CROSS-REFERENCE TO RELATED APPLICATIONS

This is a continuation of International Patent Application No. PCT/CN2020/110632 filed on Aug. 21, 2020, which claims priority to Chinese Patent Application No. 201910883760.4 filed on Sep. 18, 2019. The disclosures of the aforementioned applications are hereby incorporated by reference in their entireties.

TECHNICAL FIELD

Embodiments of this application relate to the field of media technologies, and in particular, to a method and an apparatus for improving sound quality of a speaker.

BACKGROUND

A speaker is increasingly widely used in a portable terminal device. For example, the speaker is used to play music or a video, make a hands-free call, play a ringtone of a mobile phone, or the like. Sound quality of the speaker is an important indicator of performance of the speaker, and the sound quality of the speaker directly affects a subjective experience.

For some widely used micro speakers, nonlinearity of the speaker becomes more obvious. Consequently, obvious distortion is generated in an output result, sound quality of the speaker becomes poor, and an auditory experience is affected. Currently, a nonlinear compensation technology may be used to perform nonlinear compensation on an input signal of the speaker, to reduce signal distortion. Specifically, a nonlinear parameter (for example, a force factor, mechanical stiffness, inductance, or damping) of the speaker may be obtained in a related nonlinear parameter identification method, and then nonlinear compensation is performed on the input signal based on the nonlinear parameter of the speaker.

However, because a status of the speaker may change, the nonlinear parameter obtained in the foregoing method differs from an actual nonlinear parameter. Consequently, there is a poor effect of performing nonlinear compensation on the speaker, and therefore, the sound quality of the speaker may be poor.

SUMMARY

Embodiments of this application provide a speaker improvement method and apparatus, to effectively improve a sound effect of the speaker.

To achieve the foregoing objective, the following technical solutions are used in embodiments of this application.

According to a first aspect, an embodiment of this application provides a method for improving sound quality of a speaker. The method includes: performing interpolation on a second nonlinear parameter of the speaker based on direct current resistance of the speaker, to obtain a third nonlinear parameter of the speaker, where the second nonlinear parameter is a nonlinear parameter preconfigured in the speaker; performing signal compensation on a first input signal of the speaker based on the third nonlinear parameter, to obtain a compensated first input signal; and performing filtering on the compensated first input signal, to obtain an output signal of the speaker.

Optionally, the second nonlinear parameter may be obtained by adjusting a first nonlinear parameter of the speaker.

A nonlinear parameter of the speaker is a nonlinear characteristic of the speaker, and is an inherent nonlinear characteristic brought by a hardware structure of the speaker (for example, a structural feature such as a small size and large displacement of the speaker). The nonlinear parameter of the speaker includes a force factor, mechanical stiffness, inductance, damping, or the like of the speaker. In this embodiment of this application, the nonlinear parameter of the speaker (for example, the first nonlinear parameter, the second nonlinear parameter, and the third nonlinear parameter) includes at least one of the force factor, the mechanical stiffness, the inductance, and the damping of the speaker.

According to the method for improving sound quality of a speaker in this embodiment of this application, the third nonlinear parameter is obtained by performing interpolation on the second nonlinear parameter based on the direct current resistance of the speaker. The nonlinear parameter (that is, the third nonlinear parameter) is a nonlinear parameter corresponding to a current working state of the speaker, in other words, is a real-time nonlinear parameter. The nonlinear parameter has high accuracy. Therefore, signal compensation can be more effectively performed on the first input signal of the speaker based on the third nonlinear parameter, and filtering is performed on the compensated first input signal, to further reduce signal distortion. In this way, the sound quality of the speaker can be effectively improved.

In a possible implementation, the method for performing interpolation on a second nonlinear parameter based on direct current resistance of the speaker, to obtain a third nonlinear parameter of the speaker may specifically include: determining a temperature of a coil of the speaker based on the direct current resistance of the speaker; and performing interpolation on the second nonlinear parameter based on the temperature of the coil, to obtain the third nonlinear parameter.

In this embodiment of this application, the output signal of the speaker, the second nonlinear parameter, and a linear parameter of the speaker are input into a speaker model, to obtain the direct current resistance of the speaker and a current, displacement, and a velocity that exist at a current moment. The current, the displacement, and the velocity that exist at the current moment are used to perform signal compensation on a next signal in the input signal.

In this embodiment of this application, a relationship between the temperature of the coil (which may also be referred to as a temperature of a voice coil) of the speaker and the direct current resistance of the coil of the speaker is as follows:

$$T = \frac{1}{\eta}\left(\frac{R}{R_0} - 1\right) + 25$$

Herein, T is the temperature of the coil of the speaker, R is the direct current resistance of the coil of the speaker, $\eta$ is a temperature rise coefficient, $R_o$ is direct current resistance of the coil that corresponds to a calibration temperature, and the temperature of the voice coil is usually calibrated at 25 degrees Celsius.

After the direct current resistance of the speaker is obtained, the temperature of the coil of the speaker may be obtained based on the foregoing formula.

In this embodiment of this application, characteristic curves of the nonlinear parameter that exist when the temperature of the coil of the speaker has different temperature values may be obtained, and then linear interpolation is performed on the characteristic curve of the nonlinear parameter based on the temperature of the coil of the speaker, a temperature threshold 1, and a temperature threshold 2, to obtain a target characteristic curve (the target characteristic curve may be understood as an estimation result of a characteristic curve of the third nonlinear parameter). The temperature threshold 2 is greater than the temperature threshold 1.

For example, the temperature of the coil of the speaker is denoted as T, the temperature threshold 1 is denoted as $T_{min}$, and the temperature threshold 2 is denoted as $T_{max}$.

If $T<T_{min}$, a characteristic curve corresponding to $T_{min}$ is used as the target characteristic curve.

If $T>T_{max}$, a characteristic curve corresponding to $T_{max}$ is used as the target characteristic curve.

If $T_{min} \le T \le T_{max}$, linear interpolation is performed on a characteristic curve corresponding to $T_{min}$ and a characteristic curve corresponding to $T_{max}$ based on the temperature of the coil of the speaker, to generate the target characteristic curve.

Finally, polynomial fitting is performed on the target characteristic curve, to obtain each coefficient of a polynomial corresponding to the target characteristic curve. Each coefficient is in a one-to-one correspondence with a nonlinear parameter. Therefore, the third nonlinear parameter may be determined based on each coefficient of the polynomial.

In a possible implementation, in this embodiment of this application, the compensated first input signal is recorded as a first signal, and the process of performing filtering on the compensated first input signal includes: performing filtering on the first signal by using a wavetrap, to obtain a second signal; calculating a difference between the first signal and the second signal, to obtain a third signal; multiplying a filtering gain by the third signal, to obtain a fourth signal; calculating a difference between the first signal and the fourth signal, to obtain a fifth signal; and using the fifth signal as an output signal of the speaker.

In a possible implementation, the method for improving sound quality of a speaker in this embodiment of this application may further include: generating a filtering gain. The filtering gain is used to perform filtering on the compensated first input signal.

In this embodiment of this application, the filtering gain may be generated based on the input signal. Specifically, the generating a filtering gain may include S1 and S2.

S1: Determine a maximum value of an absolute voltage value in a current frame.

It should be understood that the first input signal includes a plurality of signal frames, each signal frame includes a plurality of input voltages, and a voltage with a largest absolute value in the plurality of input voltages is the maximum value of the absolute voltage value in the current frame.

S2: Determine the filtering gain based on the maximum value of the absolute voltage value.

In this embodiment of this application, the maximum value of the absolute voltage value is denoted as $U_{max}$, the filtering gain is denoted as α, and the determining the filtering gain based on the maximum value of the absolute voltage value includes:

$$\text{When } U_{max} < U_{lowlimit},$$

$$\alpha = \alpha_{buffer} * \alpha_{smooth},$$

where $U_{lowlimit}$ is a voltage control lower limit, $\alpha_{buffer}$ is a filtering gain corresponding to a previous frame, $\alpha_{smooth}$ is a smoothing coefficient of the filtering gain, and * represents convolution;

$$\text{when } U_{uplimit} \le U_{max} \le U_{lowlimit},$$

$$\alpha = \alpha_{buffer} * \alpha_{smooth} + \frac{U_{max} - U_{lowlimit}}{U_{uplimit} - U_{lowlimit}} * (\alpha_{uplimit} - \alpha_{lowlimit}) * (1 - \alpha_{smooth}),$$

where $U_{uplimit}$ is a voltage control upper limit, $\alpha_{uplimit}$ is a control upper limit of the filtering gain, and $\alpha_{lowlimit}$ is a control lower limit of the filtering gain; or $$\text{when } U_{max} > U_{uplimit},$$

$$\alpha = \alpha_{buffer} * \alpha_{smooth} + \alpha_{uplimit} * (1 - \alpha_{smooth})$$

In a possible implementation, the first nonlinear parameter of the speaker may be adjusted based on an acoustic signal of the speaker or a displacement signal of the speaker, to obtain the second nonlinear parameter of the speaker.

In this embodiment of this application, the first nonlinear parameter is a nonlinear parameter of the speaker in an original state (which can be understood as a state in which the speaker is manufactured and is not put into use). Before delivery of the speaker, the first nonlinear parameter of the speaker is first adjusted, a parameter of the speaker is adjusted from the first nonlinear parameter to the second nonlinear parameter, and then the speaker is delivered and is put into use.

In a possible implementation, the method for adjusting the first nonlinear parameter of the speaker based on the acoustic signal of the speaker or the displacement signal of the speaker, to obtain the second nonlinear parameter of the speaker may specifically include: determining a target to-be-adjusted parameter from the first nonlinear parameter of the speaker based on the acoustic signal of the speaker or the displacement signal of the speaker; and calibrating the target to-be-adjusted parameter in the first nonlinear parameter of the speaker based on a target direction and the target step, to obtain the second nonlinear parameter.

In this embodiment of this application, the target direction may include a forward direction and a reverse direction. The forward direction may be defined as a direction in which the nonlinear parameter is increased, and the reverse direction may be defined as a direction in which the nonlinear parameter is decreased. The target direction may be specifically defined based on an actual requirement. This is not limited in this embodiment of this application.

The target step represents an adjustment (increase or decrease) amplitude of the nonlinear parameter, and the target step may include a target step corresponding to the forward direction and a target step corresponding to the reverse direction.

Optionally, the target step corresponding to the forward direction may be the same as or different from the target step corresponding to the reverse direction. This is not specifically limited in this embodiment of this application.

In a possible implementation, the method for determining a target to-be-adjusted parameter from the first nonlinear parameter of the speaker based on the acoustic signal of the speaker or the displacement signal of the speaker may include: performing Fourier transform on the acoustic signal of the speaker or the displacement signal of the speaker, to obtain harmonic distortion; determining a candidate to-be-adjusted parameter from the first nonlinear parameter of the speaker based on the harmonic distortion; and determining the target to-be-adjusted parameter from the candidate to-be-adjusted parameter.

In this embodiment of this application, harmonic distortion in a Fourier transform result corresponding to an acoustic signal or a displacement signal collected after signal compensation is performed on the input signal is referred to as first harmonic distortion, and harmonic distortion in a Fourier transform result corresponding to an acoustic signal or a displacement signal collected before compensation is performed on the input signal is referred to as second harmonic distortion. Therefore, the determining a candidate to-be-adjusted parameter from the first nonlinear parameter of the speaker may include: determining the candidate to-be-adjusted parameter based on the first harmonic distortion and the second harmonic distortion. The determining the candidate to-be-adjusted parameter based on the first harmonic distortion and the second harmonic distortion specifically includes: determining a ratio of each order of harmonic distortion in the second harmonic distortion to each order of harmonic distortion corresponding to the first harmonic distortion; and determining, as the candidate to-be-adjusted parameter, a nonlinear parameter corresponding to each ratio that is of harmonic distortion and that is greater than a preset threshold.

After the candidate to-be-adjusted parameter is determined, a convergence error of each nonlinear parameter in the candidate to-be-adjusted parameter is obtained, the convergence error of each nonlinear parameter in the candidate to-be-adjusted parameter is compared with a preset error threshold corresponding to each nonlinear parameter, and each nonlinear parameter whose convergence error is greater than the error threshold in the candidate to-be-adjusted parameter is determined as the target to-be-adjusted parameter.

In a possible implementation, the method for improving sound quality of a speaker in this embodiment of this application may further include: obtaining the acoustic signal of the speaker; or obtaining the displacement signal of the speaker.

In a possible implementation, the method for improving sound quality of the speaker in this embodiment of this application may further include: determining displacement of the speaker; determining a signal control gain of the speaker based on the displacement of the speaker and a preset displacement threshold; and performing gain control on a second input signal of the speaker based on the signal control gain of the speaker, to obtain the first input signal.

In this embodiment of this application, displacement protection may be performed on the speaker by determining the displacement of the speaker; determining the signal control gain of the speaker based on the displacement of the speaker and the preset displacement threshold; and performing gain control on the second input signal of the speaker based on the signal control gain of the speaker, to reduce a gain of the input signal, avoid an abrupt change in a speaker volume of the speaker, ensure that the displacement of the speaker does not exceed an upper safety limit, and improve a sound effect of the speaker.

Further, a signal obtained after gain control is performed on the second input signal of the speaker is used as the first input signal, and signal compensation is performed based on this, so that a signal compensation effect can be improved, and a sound effect of the speaker can be further improved.

In a possible implementation, the method for determining displacement of the speaker may include: performing first displacement conversion on the second input signal, to obtain a maximum value of first predicted displacement and an effective value of the first predicted displacement; determining a displacement correction gain; and determining the displacement of the speaker based on the maximum value of the first predicted displacement and the displacement correction gain.

In this embodiment of this application, a displacement transfer function of the speaker is used when the first displacement conversion is performed, and the displacement transfer function may be updated based on a nonlinear parameter obtained in real time. Specifically, a feedback signal (a feedback voltage) that is of the speaker and that exists at a previous moment is input into a linear parameter identification model, to obtain a linear parameter of the speaker, and further, the displacement transfer function is updated based on the linear parameter.

In a possible implementation, the method for improving sound quality of a speaker in this embodiment of this application may further include: performing second displacement conversion on the feedback signal of the speaker, to obtain an effective value of second predicted displacement.

In this embodiment of this application, an induced electromotive force model of the speaker is used when the second displacement conversion is performed, and the induced electromotive force model may be updated based on a nonlinear parameter obtained in real time. Specifically, a feedback signal (the feedback voltage) that is of the speaker and that exists at a previous moment is input into a linear parameter identification model, to obtain a linear parameter of the speaker, and further, the induced electromotive force model is updated based on the linear parameter.

In a possible implementation, the method for determining a displacement correction gain may specifically include: determining the displacement correction gain based on the effective value of the first predicted displacement and the effective value of the second predicted displacement.

In a possible implementation, the method for determining the displacement correction gain based on the effective value of the first predicted displacement and the effective value of the second predicted displacement may specifically include: determining an effective value of third predicted displacement based on the effective value of the first predicted displacement and the effective value of the second predicted displacement; and determining the displacement correction gain based on the effective value of the first predicted displacement and the effective value of the third predicted displacement.

In this embodiment of this application, the displacement correction gain $G_c(t_n)$ may be as follows:

$$G_c(t_n) = \frac{X_{mean\_est}(t_n)}{X_{mean\_ts}(t_n)}$$

Herein, $X_{mean\_est}(t_n) = KalmanFilter[X_{mean\_ts}(t_n), X_{mean\_emf}(t_n)]$, $X_{mean\_ts}(t_n)$ represents the effective value of the first predicted displacement, $X_{mean\_emf}(t_n)$ represents the effective value of the second predicted displacement, $X_{mean\_est}(t_n)$ represents calculating the effective value of the third predicted displacement, and KalmanFilter represents a Kalman filter.

According to a second aspect, an embodiment of this application provides a method for improving sound quality of a speaker. The method may include: performing first displacement conversion on an input signal of the speaker, to obtain a maximum value of first predicted displacement and an effective value of the first predicted displacement; performing second displacement conversion on a feedback signal of the speaker, to obtain an effective value of second predicted displacement; determining a displacement correction gain based on the effective value of the first predicted displacement and the effective value of the second predicted displacement; determining displacement of the speaker based on the maximum value of the first predicted displacement and the displacement correction gain; determining a signal control gain of the speaker based on the displacement of the speaker and a preset displacement threshold; and performing gain control on the input signal of the speaker based on the signal control gain of the speaker, to obtain an output signal of the speaker.

Compared with the conventional technology, in the foregoing method, the displacement of the speaker can be determined in real time, and displacement protection is performed on the speaker based on the determined displacement of the speaker (which indicates to perform gain control on the input signal of the speaker based on the signal control gain determined based on the displacement of the speaker), so that a gain of the input signal is reduced, an abrupt change in a speaker volume of the speaker is avoided, it can be ensured that the displacement of the speaker does not exceed an upper safety limit, and a sound effect of the speaker can be improved.

In a possible implementation, the method for determining a displacement correction gain based on the effective value of the first predicted displacement and the effective value of the second predicted displacement specifically includes: determining an effective value of third predicted displacement based on the effective value of the first predicted displacement and the effective value of the second predicted displacement; and determining the displacement correction gain based on the effective value of the first predicted displacement and the effective value of the third predicted displacement.

According to a third aspect, an embodiment of this application provides a sound quality improvement apparatus, including an interpolation module, a signal compensation module, and a filtering module. The interpolation module is configured to perform interpolation on a second nonlinear parameter of a speaker based on direct current resistance of the speaker, to obtain a third nonlinear parameter of the speaker. The second nonlinear parameter is a nonlinear parameter preconfigured in the speaker. The signal compensation module is configured to perform signal compensation on a first input signal of the speaker based on the third nonlinear parameter, to obtain a compensated first input signal. The filtering module is configured to perform filtering on the compensated first input signal, to obtain an output signal of the speaker.

In a possible implementation, the interpolation module is specifically configured to: determine a temperature of a coil of the speaker based on the direct current resistance of the speaker, and perform interpolation on the second nonlinear parameter based on the temperature of the coil, to obtain the third nonlinear parameter.

In a possible implementation, the sound quality improvement apparatus provided in this embodiment of this application further includes a generation module. The generation module is configured to generate a filtering gain. The filtering gain is used to perform filtering on the compensated first input signal.

In a possible implementation, the sound quality improvement apparatus provided in this embodiment of this application further includes a parameter adjustment module. The parameter adjustment module is configured to adjust a first nonlinear parameter of the speaker based on an acoustic signal of the speaker or a displacement signal of the speaker, to obtain the second nonlinear parameter of the speaker.

In a possible implementation, the parameter adjustment module is specifically configured to: determine a target to-be-adjusted parameter from the first nonlinear parameter of the speaker based on the acoustic signal of the speaker or the displacement signal of the speaker; and calibrate the target to-be-adjusted parameter in the first nonlinear parameter of the speaker based on a target direction and a target step, to obtain the second nonlinear parameter.

In a possible implementation, the parameter adjustment module is specifically configured to: perform Fourier transform on the acoustic signal of the speaker or the displacement signal of the speaker, to obtain harmonic distortion; determine a candidate to-be-adjusted parameter from the first nonlinear parameter of the speaker based on the harmonic distortion; and determine the target to-be-adjusted parameter from the candidate to-be-adjusted parameter.

In a possible implementation, the sound quality improvement apparatus provided in this embodiment of this application may further include an obtaining module. The obtaining module is configured to: obtain the acoustic signal of the speaker; or obtain the displacement signal of the speaker.

In a possible implementation, the sound quality improvement apparatus provided in this embodiment of this application further includes a displacement determining module, a control gain determining module, and a gain control module. The displacement determining module is configured to determine displacement of the speaker. The control gain determining module is configured to determine a signal control gain of the speaker based on the displacement of the speaker and a preset displacement threshold. The gain control module is configured to perform gain control on a second input signal of the speaker based on the signal control gain of the speaker, to obtain the first input signal.

In a possible implementation, the displacement determining module is specifically configured to: perform first displacement conversion on the second input signal, to obtain a maximum value of first predicted displacement and an effective value of the first predicted displacement; determine a displacement correction gain; and determine the displacement of the speaker based on the maximum value of the first predicted displacement and the displacement correction gain.

In a possible implementation, the displacement determining module is further configured to perform second displacement conversion on a feedback signal of the speaker, to obtain an effective value of second predicted displacement.

In a possible implementation, the displacement determining module is specifically configured to determine the displacement correction gain based on the effective value of the first predicted displacement and the effective value of the second predicted displacement.

In a possible implementation, the displacement determining module is specifically configured to: determine an effective value of third predicted displacement based on the effective value of the first predicted displacement and the effective value of the second predicted displacement; and determine the displacement correction gain based on the effective value of the first predicted displacement and the effective value of the third predicted displacement.

According to a fourth aspect, an embodiment of this application provides a sound quality improvement apparatus, including a displacement determining module, a control gain determining module, and a gain control module. The displacement determining module is configured to: perform first displacement conversion on an input signal of a speaker, to obtain a maximum value of first predicted displacement and an effective value of the first predicted displacement; perform second displacement conversion on a feedback signal of the speaker, to obtain an effective value of second predicted displacement; determine a displacement correction gain based on the effective value of the first predicted displacement and the effective value of the second predicted displacement; and determine displacement of the speaker based on the maximum value of the first predicted displacement and the displacement correction gain. The control gain determining module is configured to determine a signal control gain of the speaker based on the displacement of the speaker and a preset displacement threshold. The gain control module is configured to perform gain control on the input signal of the speaker based on the signal control gain of the speaker, to obtain an output signal of the speaker.

In a possible implementation, the displacement determining module is specifically configured to: determine an effective value of third predicted displacement based on the effective value of the first predicted displacement and the effective value of the second predicted displacement; and determine the displacement correction gain based on the effective value of the first predicted displacement and the effective value of the third predicted displacement.

According to a fifth aspect, an embodiment of this application provides a sound quality improvement apparatus, including a processor and a memory coupled to the processor. The memory is configured to store computer instructions. When the apparatus runs, the processor executes the computer instructions stored in the memory, so that the apparatus performs the method for improving sound quality of a speaker according to any one of the first aspect and the possible implementations of the first aspect.

According to a sixth aspect, an embodiment of this application provides a sound quality improvement apparatus. The apparatus exists in a product form of a chip. A structure of the apparatus includes a processor and a memory. The memory is configured to be coupled to the processor, the memory is configured to store computer instructions, and the processor is configured to execute the computer instructions stored in the memory, so that the apparatus performs the method for improving sound quality of a speaker according to any one of the first aspect and the possible implementations of the first aspect.

According to a seventh aspect, an embodiment of this application provides a computer-readable storage medium. The computer-readable storage medium may include computer instructions, and when the computer instructions run on a computer, a sound quality improvement apparatus is enabled to perform the method for improving sound quality of a speaker according to any one of the first aspect and the possible implementations of the first aspect.

According to an eighth aspect, an embodiment of this application provides a sound quality improvement apparatus, including a processor and a memory coupled to the processor. The memory is configured to store computer instructions. When the apparatus runs, the processor executes the computer instructions stored in the memory, so that the apparatus performs the method for improving sound quality of a speaker according to any one of the second aspect and the possible implementations of the second aspect.

According to a ninth aspect, an embodiment of this application provides a sound quality improvement apparatus. The apparatus exists in a product form of a chip. A structure of the apparatus includes a processor and a memory. The memory is configured to be coupled to the processor, the memory is configured to store computer instructions, and the processor is configured to execute the computer instructions stored in the memory, so that the apparatus performs the method for improving sound quality of a speaker according to any one of the second aspect and the possible implementations of the second aspect.

According to a tenth aspect, an embodiment of this application provides a computer-readable storage medium. The computer-readable storage medium may include computer instructions, and when the computer instructions run on a computer, a sound quality improvement apparatus is enabled to perform the method for improving sound quality of a speaker according to any one of the second aspect and the possible implementations of the second aspect.

It should be understood that, for beneficial effects achieved by the technical solutions in the third aspect to the tenth aspect of embodiments of this application and the corresponding possible implementations, refer to the foregoing technical effects of the first aspect and the corresponding possible implementations of the first aspect or the second aspect and the corresponding possible implementations of the second aspect. Details are not described herein again.

DESCRIPTION OF EMBODIMENTS

Figure 1:
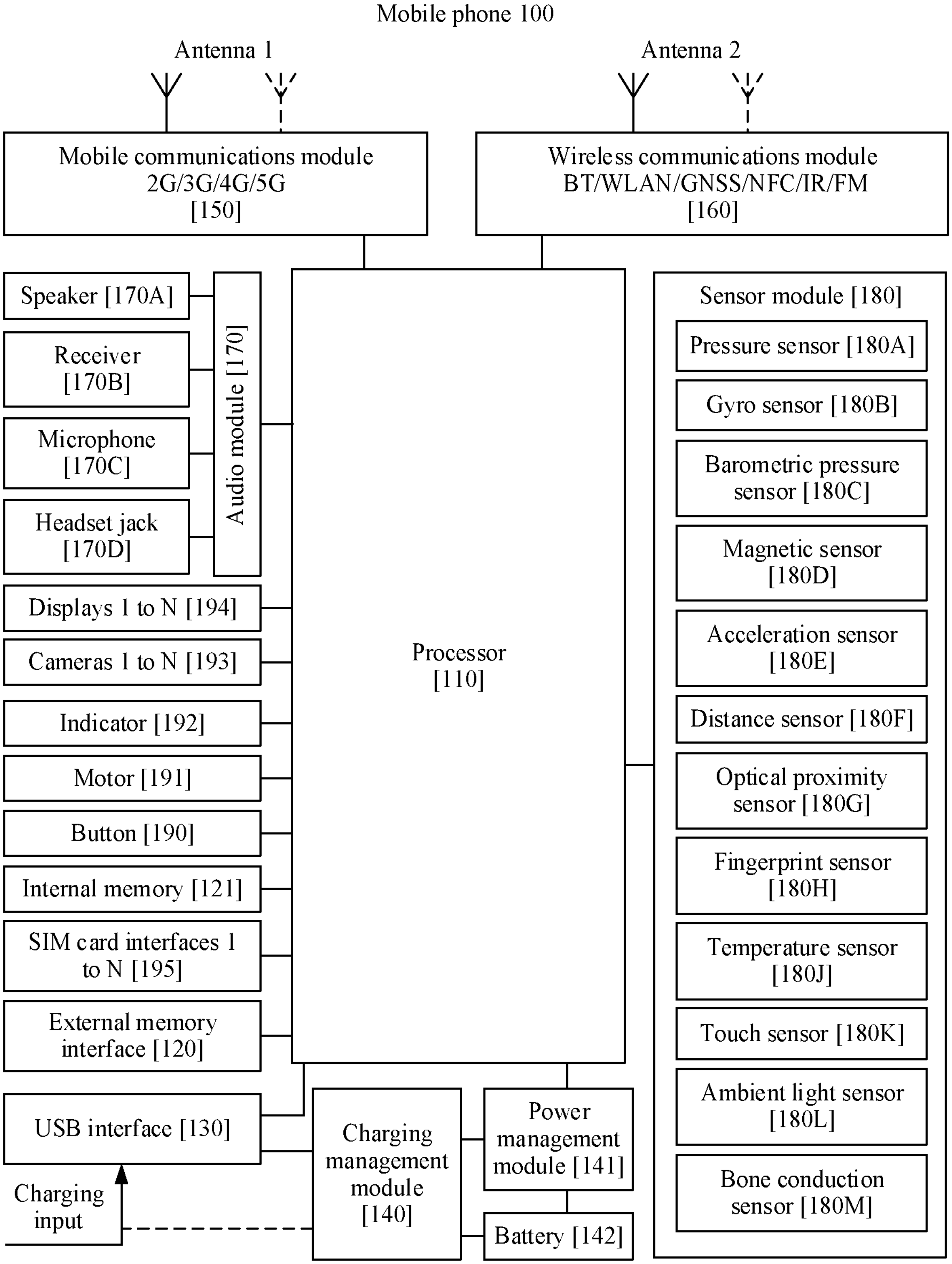
FIG. 1 is a schematic diagram of a structure of a mobile phone according to an embodiment of this application.

The term "and/or" in this specification describes only an association relationship for describing associated objects and represents that three relationships may exist. For example, A and/or B may represent the following three cases: Only A exists, both A and B exist, and only B exists.

In the specification and claims in embodiments of this application, the terms "first", "second", and the like are intended to distinguish between different objects but do not indicate a particular order of the objects. For example, a first nonlinear parameter, a second nonlinear parameter, and the like are used to distinguish between different nonlinear parameters, but are not used to describe specific orders of the nonlinear parameters. A first input signal and a second input signal are used to distinguish between different input signals, but are not used to describe particular orders of the input signals.

In embodiments of this application, the word such as "example" or "for example" is used to represent giving an example, an illustration, or a description. Any embodiment or design scheme described as "example" or "for example" in embodiments of this application should not be explained as being more preferred or having more advantages than another embodiment or design scheme. To be exact, use of the expressions like "example" and "for example" is intended to give a specific presentation of a related concept.

In the description of embodiments of this application, unless otherwise stated, "a plurality of" means two or more than two. For example, a plurality of processing units refer to two or more processing units, and a plurality of systems refer to two or more systems.

First, some basic knowledge and concepts in a method and an apparatus for improving sound quality of a speaker in the embodiments of this application are explained and described.

Currently, factors that affect the sound quality of the speaker may include a nonlinear factor of the speaker and displacement of the speaker (the following displacement of the speaker is displacement of a diaphragm of the speaker).

Impact of the nonlinear factor of speaker on the sound quality: Nonlinearity of the speaker is a phenomenon that output sound quality of the speaker is distorted due to a hardware structure of the speaker (for example, a structural feature such as a small size and large displacement of the speaker), and may be referred to as nonlinear distortion. Especially, when a signal of high amplitude is input into the speaker, the nonlinearity of the speaker is more obvious, and there may be too much distortion in an output signal, affecting an auditory experience.

Impact of the displacement of the speaker on the sound quality: When the displacement of the diaphragm of the speaker is too large, the diaphragm of the speaker may be in a physical collision, causing noise and even mechanical damage to the speaker.

In the embodiments of this application, a nonlinear parameter of the speaker may be used to compensate for the nonlinear distortion caused by hardware of the speaker, to improve the sound quality of the speaker. In addition, the displacement of the speaker can be controlled, to improve the sound quality of the speaker.

It should be understood that the nonlinear parameter of the speaker may include but is not limited to the following parameters:

A force factor BL(x) is a force factor of a magnetic circuit system of the speaker.

Mechanical stiffness Kms(x) is stiffness of a suspension system of the speaker, and Kms(x) may include different coefficients such as a first order coefficient, a second order coefficient, and a third order coefficient.

Inductance Le(x) is inductance of a coil of the speaker.

Damping Rm(v) is a damping coefficient of the speaker, and Rm(v) may include different coefficients such as a first order coefficient, a second order coefficient, and a third order coefficient.

Herein, x is the displacement of the diaphragm of the speaker, and v is a moving velocity of the diaphragm of the speaker.

It should be noted that, the nonlinear parameter of the speaker may change in different working states of the speaker. For example, when the coil of the speaker is at different temperatures, a value of Kms(x) may change, and a value of Rm(v) may also change. In other words, there are different values of Kms(x) at different temperatures, and there are different values of Rm(v) at different temperatures.

Input signals of the speaker include M (M is a positive integer greater than or equal to 1) digital signals and n corresponding voltage values (which may also be referred to as n points). For example, the input signals $U_{in}=[U_{in}(1), U_{in}(2), \ldots, U_{in}(n), \ldots,$ and $U_{in}(M)]$. In the embodiments of this application, processing the input signals is to sequentially process all digital signals in the input signals. For ease of description, a moment at which the nth digital signal is input is denoted as $t_n$, and an input signal corresponding to the moment $t_n$ is denoted as $U_{in}(n)$ or $U_{in}(t_n)$.

Based on the problem existing in the background, the embodiments of this application provide a method and an apparatus for improving sound quality of a speaker. A nonlinear parameter (that is, a third nonlinear parameter in the following embodiments) of the speaker may be obtained in an interpolation method based on direct current resistance of the speaker, nonlinear compensation is performed on an input signal of the speaker based on the nonlinear parameter, and filtering is performed on the compensated input signal, to obtain an output signal of the speaker. Therefore, nonlinear compensation is performed on the speaker, and sound quality of the speaker can be improved.

The method and the apparatus for improving sound quality of a speaker in the embodiments of this application may be applied to a terminal device having a speaker function, for example, an electronic device provided with a speaker such as a mobile phone, a tablet computer, a notebook computer, a smart speaker, or a television. For example, the technical solutions provided in the embodiments of this application may be used in a scenario such as playing music and a movie in a speaker mode (including monaural, binaural, and quadraphonic playing), a hands-free call (including an operator call, an Internet call, or the like), a ringtone of a mobile phone (including a speaker mode and a headphone mode), or playing a game in a speaker mode, to improve the sound quality of the speaker, and improve a subjective experience of a user.

For example, the terminal device is a mobile phone. FIG. 1 is a schematic diagram of a structure of a mobile phone 100. The mobile phone 100 may include a processor 110, an external memory interface 120, an internal memory 121, a universal serial bus (USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of this application does not constitute a specific limitation on the mobile phone 100. In some other embodiments of this application, the mobile phone 100 may include more or fewer components than those shown in the figure, or some components may be combined, or some components may be split, or there may be a different component layout. The components shown in the figure may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a memory, a video codec, a digital signal processor (DSP), a baseband processor, and/or a neural-network processing unit (NPU). Different processing units may be independent devices, or may be integrated into one or more processors.

The controller may be a nerve center and a command center of the mobile phone 100. The controller may generate an operation control signal based on an instruction operation code and a time sequence signal, to control to fetch instructions and execute instructions.

A memory may be further disposed in the processor 110, and is configured to store instructions and data. In some embodiments, the memory in the processor 110 is a cache. The memory may store instructions or data that has just been used or is cyclically used by the processor 110. If the processor 110 needs to use the instructions or the data again, the processor may directly invoke the instructions or the data from the memory. This avoids repeated access and reduces waiting time of the processor 110. Therefore, system efficiency is improved.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a SIM interface, a USB interface, and/or the like.

The I2C interface is a two-way synchronous serial bus, including a serial data line (SDA) and a serial clock line (SCL). In some embodiments, the processor 110 may include a plurality of groups of I2C buses. The processor 110 may be separately coupled to the touch sensor 180K, a charger, a flash, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the mobile phone 100.

The I2S interface may be configured to perform audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transfer an audio signal to the wireless communications module 160 through the I2S interface, to implement a function of answering a call by using a Bluetooth headset.

The PCM interface may also be configured to perform audio communication, and sample, quantize, and code an analog signal. In some embodiments, the audio module 170 may be coupled to the wireless communications module 160 through a PCM bus interface. In some embodiments, the audio module 170 may alternatively transfer an audio signal to the wireless communications module 160 through the PCM interface, to implement a function of answering a call by using a Bluetooth headset. Both the I2S interface and the PCM interface may be configured to perform audio communication.

The UART interface is a universal serial data bus, and is configured to perform asynchronous communication. The bus may be a two-way communications bus. The bus switches to-be-transmitted data between serial communication and parallel communication. In some embodiments, the UART interface is usually configured to connect the processor 110 to the wireless communications module 160. For example, the processor 110 communicates with a Bluetooth module in the wireless communications module 160 through the UART interface, to implement a Bluetooth function. In some embodiments, the audio module 170 may transfer an audio signal to the wireless communications module 160 through the UART interface, to implement a function of playing music by using a Bluetooth headset.

The MIPI interface may be configured to connect the processor 110 to a peripheral component such as the display 194 or the camera 193. The MIPI interface includes a camera serial interface (CSI), a display serial interface (DSI), or the like. In some embodiments, the processor 110 communicates with the camera 193 through the CSI interface, to implement a photographing function of the mobile phone 100. The processor 110 communicates with the display 194 through the DSI interface, to implement a display function of the mobile phone 100.

The GPIO interface may be configured by using software. The GPIO interface may be configured as a control signal or a data signal. In some embodiments, the GPIO interface may be configured to connect the processor 110 to the camera 193, the display 194, the wireless communications module 160, the audio module 170, the sensor module 180, and the like. The GPIO interface may alternatively be configured as an I2C interface, an I2S interface, a UART interface, an MIPI interface, or the like.

The USB interface 130 is an interface that complies with a USB standard specification, and may be specifically a mini USB interface, a micro USB interface, a USB Type-C interface, or the like. The USB interface 130 may be configured to connect to the charger to charge the mobile phone 100, or may be configured to transmit data between the mobile phone 100 and a peripheral device, or may be configured to connect to a headset, to play audio by using the headset. The interface may be further configured to connect to another electronic device such as an AR device.

It may be understood that an interface connection relationship between the modules shown in this embodiment of this application is merely an example for description, and does not constitute a limitation on the structure of the mobile phone 100. In some other embodiments of this application, the mobile phone 100 may alternatively use an interface connection manner different from that in the foregoing embodiment, or use a combination of a plurality of interface connection manners.

The charging management module 140 is configured to receive a charging input from the charger. The charger may be a wireless charger or a wired charger. In some embodiments in which wired charging is used, the charging management module 140 may receive a charging input from the wired charger through the USB interface 130. In some embodiments of wireless charging, the charging management module 140 may receive a wireless charging input by using a wireless charging coil of the mobile phone 100. The charging management module 140 may further supply power to the electronic device by using the power management module 141 when the battery 142 is charged.

The power management module 141 is configured to connect to the battery 142, the charging management module 140, and the processor 110. The power management module 141 receives an input of the battery 142 and/or the charging management module 140, and supplies power to the processor 110, the internal memory 121, an external memory, the display 194, the camera 193, the wireless communications module 160, and the like. The power management module 141 may be further configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the mobile phone 100 may be implemented by using the antenna 1, the antenna 2, the mobile communications module 150, the wireless communications module 160, the modem processor, the baseband processor, and the like.

The antenna 1 and the antenna 2 are configured to transmit and receive electromagnetic wave signals. Each antenna in the mobile phone 100 may be configured to cover one or more communication frequency bands. Different antennas may be multiplexed to improve antenna utilization. For example, the antenna 1 may be multiplexed as a diversity antenna in a wireless local area network. In some other embodiments, an antenna may be used in combination with a tuning switch.

The mobile communications module 150 may provide a solution, applied to the mobile phone 100, for wireless communication including 2G, 3G, 4G, 5G, or the like. The mobile communications module 150 may include at least one filter, a switch, a power amplifier, a low-noise amplifier (LNA), and the like. The mobile communications module 150 may receive an electromagnetic wave through the antenna 1, perform processing such as filtering and amplification on the received electromagnetic wave, and transmit a processed electromagnetic wave to the modem processor for demodulation. The mobile communications module 150 may further amplify a signal modulated by the modem processor, and convert the signal to an electromagnetic wave for radiation through the antenna 1. In some embodiments, at least some function modules of the mobile communications module 150 may be disposed in the processor 110. In some embodiments, at least some function modules in the mobile communications module 150 may be disposed in a same device as at least some modules in the processor 110.

The modem processor may include a modulator and a demodulator. The modulator is configured to modulate a to-be-sent low-frequency baseband signal into a medium/high-frequency signal. The demodulator is configured to demodulate a received electromagnetic wave signal into a low-frequency baseband signal. Then, the demodulator transmits the low-frequency baseband signal obtained through demodulation to the baseband processor for processing. The baseband processor processes the low-frequency baseband signal, and then transmits a processed signal to the application processor. The application processor outputs a sound signal by using an audio device (which is not limited to the speaker 170A, the receiver 170B, or the like), or displays an image or a video on the display 194. In some embodiments, the modem processor may be an independent component. In some other embodiments, the modem processor may be independent of the processor 110, and is disposed in a same device as the mobile communications module 150 or another function module.

The wireless communications module 160 may provide a solution, applied to the mobile phone 100, for wireless communication including a wireless local area network (WLAN) (for example, a Wi-Fi network), BLUETOOTH (BT), a global navigation satellite system (GNSS), frequency modulation (FM), near field communication (NFC), an infrared (IR) technology, and the like. The wireless communications module 160 may be one or more components integrating at least one communications processing module. The wireless communications module 160 receives an electromagnetic wave through the antenna 2, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, and convert the signal into an electromagnetic wave for radiation through the antenna 2.

In some embodiments, the antenna 1 and the mobile communications module 150 of the mobile phone 100 are coupled, and the antenna 2 and the wireless communications module 160 of the mobile phone 100 are coupled, so that the mobile phone 100 can communicate with a network and another device by using a wireless communications technology. The wireless communications technology may include a Global System for Mobile Communications (GSM), a general packet radio service (GPRS), code-division multiple access (CDMA), wideband code-division multiple access (WCDMA), time-division code-division multiple access (TD-CDMA), Long-Term Evolution (LTE), BT, a GNSS, a WLAN, NFC, FM, an IR technology, and/or the like. The GNSS may include a global positioning system (GPS), a global navigation satellite system (GLONASS), a BeiDou navigation satellite system (BDS), a quasi-zenith satellite system (QZSS), and/or a satellite based augmentation system (SBAS).

The mobile phone 100 implements a display function by using the GPU, the display 194, the application processor, and the like. The GPU is a microprocessor for image processing, and is connected to the display 194 and the application processor. The GPU is configured to: perform mathematical and geometric calculation, and render an image. The processor 110 may include one or more GPUs that execute program instructions to generate or change display information.

The display 194 is configured to display an image, a video, and the like. The display 194 includes a display panel. The display panel may be a liquid crystal display (LCD), an organic light-emitting diode (OLED), an active-matrix organic light-emitting diode (AMOLED), a flexible light-emitting diode (FLED), a mini-LED, a micro-LED, a micro-OLED, a quantum dot light emitting diode (QLED), or the like. In some embodiments, the mobile phone 100 may include one or N displays 194, where N is a positive integer greater than 1.

The mobile phone 100 may implement a photographing function by using the ISP, the camera 193, the video codec, the GPU, the display 194, the application processor, and the like.

The ISP is configured to process data fed back by the camera 193. For example, during photographing, a shutter is pressed, and light is transmitted to a photosensitive element of a camera through a lens. An optical signal is converted into an electrical signal. The photosensitive element of the camera transmits the electrical signal to the ISP for processing, and converts the electrical signal into a visible image. The ISP may further perform algorithm optimization on noise, brightness, and complexion of the image. The ISP may further optimize parameters such as exposure and a color temperature of a shooting scenario. In some embodiments, the ISP may be disposed in the camera 193.

The camera 193 is configured to capture a static image or a video. An optical image of an object is generated through the lens, and is projected to the photosensitive element. The photosensitive element may be a charge coupled device (CCD) or a complementary metal-oxide-semiconductor (CMOS) photoelectric transistor. The photosensitive element converts an optical signal into an electrical signal, and then transmits the electrical signal to the ISP for converting the electrical signal into a digital image signal. The ISP outputs the digital image signal to the DSP for processing. The DSP converts the digital image signal into a standard image signal in an RGB format, a YUV format, or the like. In some embodiments, the mobile phone 100 may include one or N cameras 193, where N is a positive integer greater than 1.

The digital signal processor is configured to process a digital signal, and may process another digital signal (for example, an audio signal) in addition to a digital image signal. For example, when the mobile phone 100 selects a frequency, the digital signal processor is configured to perform Fourier transform and the like on frequency energy.

The video codec is configured to: compress or decompress a digital video. The mobile phone 100 may support one or more video codecs. In this way, the mobile phone 100 can play or record videos in a plurality of coding formats, for example, moving picture experts group (moving picture experts group, MPEG)-1, MPEG-2, MPEG-3, and MPEG-4.

The NPU is a neural-network (NN) computing processor that rapidly processes input information by referring to a structure of a biological neural network, for example, by referring to a transfer mode between human brain neurons, and can further perform self-learning continuously. Applications such as intelligent cognition of the mobile phone 100, for example, image recognition, facial recognition, voice recognition, and text understanding, can be implemented by using the NPU.

The external memory interface 120 may be configured to connect to an external memory card such as a micro SD card, to extend a storage capability of the mobile phone 100. The external memory card communicates with the processor 110 through the external memory interface 120, to implement a data storage function. For example, files such as music and videos are stored in the external memory card.

The internal memory 121 may be configured to store computer-executable program code. The executable program code includes instructions. The processor 110 runs the instructions stored in the internal memory 121, to perform various function applications of the mobile phone 100 and data processing. The internal memory 121 may include a program storage area and a data storage area. The program storage area may store an operating system, an application required by at least one function (for example, a sound playing function or an image playing function), and the like. The data storage area may store data (for example, audio data or an address book) created during use of the mobile phone 100, and the like. In addition, the internal memory 121 may include a high-speed random access memory, or may include a nonvolatile memory, for example, at least one magnetic disk storage device, a flash memory, or a universal flash storage (UFS).

The mobile phone 100 may implement an audio function such as music playing or recording by using the audio module 170, the speaker 170A, the receiver 170B, the microphone 170C, the headset jack 170D, the application processor, and the like.

The audio module 170 is configured to convert digital audio information into an analog audio signal for output, and is also configured to convert an analog audio input into a digital audio signal. The audio module 170 may be further configured to encode and decode audio signals. In some embodiments, the audio module 170 may be disposed in the processor 110, or some function modules of the audio module 170 are disposed in the processor 110.

The speaker 170A, also referred to as a "horn", is configured to convert an audio electrical signal into a sound signal. The mobile phone 100 may listen to music or answer a hands-free call through the speaker 170A.

The receiver 170B, also referred to as an "earpiece", is configured to convert an audio electrical signal into a sound signal. When a call is answered or voice information is received by using the mobile phone 100, the receiver 170B may be put close to a human ear to listen to a voice.

The microphone 170C, also referred to as a "mike" or a "mic", is configured to convert a sound signal into an electrical signal. When making a call or sending voice information, a user may make a sound by moving the mouth of the user close to the microphone 170C to enter a sound signal to the microphone 170C. At least one microphone 170C may be disposed in the mobile phone 100. In some other embodiments, two microphones 170C may be disposed in the mobile phone 100, to collect a sound signal and further implement a noise reduction function. In some other embodiments, three, four, or more microphones 170C may alternatively be disposed in the mobile phone 100, to collect a sound signal, reduce noise, further identify a sound source, implement a directional recording function, and the like.

The headset jack 170D is configured to connect to a wired headset. The headset jack 170D may be the USB interface 130 or a 3.5 mm open mobile terminal platform (OMTP) standard interface or a cellular telecommunications industry association of the USA (CTIA) standard interface.

The pressure sensor 180A is configured to sense a pressure signal, and may convert the pressure signal into an electrical signal. In some embodiments, the pressure sensor 180A may be disposed on the display 194. There are a plurality of types of pressure sensors 180A, such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The mobile phone 100 determines pressure intensity based on a capacitance change. When a touch operation is performed on the display 194, the mobile phone 100 detects strength of the touch operation by using the pressure sensor 180A. The mobile phone 100 may also calculate a touch location based on a detection signal of the pressure sensor 180A. In some embodiments, touch operations that are performed in a same touch position but have different touch operation strength may correspond to different operation instructions. For example, when a touch operation whose touch operation strength is less than a first pressure threshold is performed on a Messages icon, an instruction for viewing an SMS message is executed. When a touch operation whose touch operation strength is greater than or equal to the first pressure threshold is performed on the Messages icon, an instruction for creating an SMS message is executed.

The gyro sensor 180B may be configured to determine a motion posture of the mobile phone 100. In some embodiments, the gyro sensor 180B may be used to determine angular velocities of the mobile phone 100 around three axes (namely, x, y, and z axes). The gyro sensor 180B may be configured to implement image stabilization during photographing. For example, when a shutter is pressed, the gyro sensor 180B detects an angle at which the mobile phone 100 jitters, obtains, through calculation based on the angle, a distance for which a lens module needs to compensate, and allows a lens to cancel the jitter of the mobile phone 100 through reverse motion, to implement image stabilization. The gyro sensor 180B may be further used in a navigation scenario and a motion-sensing game scenario.

The barometric pressure sensor 180C is configured to measure barometric pressure. In some embodiments, the mobile phone 100 calculates an altitude based on a value of the atmospheric pressure measured by the barometric pressure sensor 180C, to assist positioning and navigation.

The magnetic sensor 180D includes a Hall effect sensor. The mobile phone 100 may detect opening and closing of a flip cover by using the magnetic sensor 180D. In some embodiments, when the mobile phone 100 is a flip phone, the mobile phone 100 may detect opening and closing of a flip cover by using the magnetic sensor 180D. Further, a feature such as automatic unlocking upon opening of the flip cover is set based on a detected opening or closing state of the flip cover.

The acceleration sensor 180E may detect a magnitude of acceleration of the mobile phone 100 in various directions (usually on three axes). When the mobile phone 100 is still, a value and a direction of gravity may be detected. The acceleration sensor 180E may be further configured to identify a posture of the electronic device, and is used in an application such as switching between a landscape mode and a portrait mode or a pedometer.

The distance sensor 180F is configured to measure a distance. The mobile phone 100 may measure a distance through infrared or laser. In some embodiments, in a photographing scenario, the mobile phone 100 may measure a distance by using the distance sensor 180F, to implement quick focusing.

The optical proximity sensor 180G may include, for example, a light-emitting diode (LED) and an optical detector such as a photodiode. The light-emitting diode may be an infrared light-emitting diode. The mobile phone 100 may emit infrared light by using the light-emitting diode. The mobile phone 100 detects reflected infrared light from a nearby object by using the photodiode. When sufficient reflected light is detected, it may be determined that there is an object near the mobile phone 100. When insufficient reflected light is detected, the mobile phone 100 may determine that there is no object near the mobile phone 100. The mobile phone 100 may detect, by using the optical proximity sensor 180G, that the user puts the mobile phone 100 close to an ear for conversation, so that automatic screen-off is implemented to save power. The optical proximity sensor 180G may also be used in a leather case mode or a pocket mode to automatically unlock or lock the screen.

The ambient light sensor 180L is configured to sense ambient light luminance. The mobile phone 100 may adaptively adjust luminance of the display 194 based on the sensed luminance of the ambient light. The ambient light sensor 180L may be further configured to automatically adjust a white balance during photographing. The ambient light sensor 180L may further cooperate with the optical proximity sensor 180G to detect whether the mobile phone 100 is in a pocket, thereby preventing an accidental touch.

The fingerprint sensor 180H is configured to collect a fingerprint. The mobile phone 100 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the mobile phone 100 executes a temperature processing policy by using the temperature detected by the temperature sensor 180J. For example, when the temperature reported by the temperature sensor 180J exceeds a threshold, the mobile phone 100 reduces performance of a processor near the temperature sensor 180J, to reduce power consumption and implement heat protection. In some other embodiments, when the temperature is lower than another threshold, the mobile phone 100 heats the battery 142, to avoid an abnormal shutdown of the mobile phone 100 caused by the low temperature. In some other embodiments, when the temperature is lower than still another threshold, the mobile phone 100 boosts an output voltage of the battery 142, to avoid an abnormal shutdown caused by a low temperature.

The touch sensor 180K is also referred to as a "touch panel". The touch sensor 180K may be disposed on the display 194, and the touch sensor 180K and the display 194 form a touchscreen, which is also referred to as a "touch screen". The touch sensor 180K is configured to detect a touch operation performed on or near the touch sensor. The touch sensor may transfer the detected touch operation to the application processor, to determine a type of a touch event. A visual output related to the touch operation may be provided on the display 194. In some other embodiments, the touch sensor 180K may alternatively be disposed on a surface of the mobile phone 100 and is at a position different from that of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a human pulse, and receive a blood pressure beating signal. In some embodiments, the bone conduction sensor 180M may alternatively be disposed in a headset, to form a bone conduction headset. The audio module 170 may obtain a voice signal through parsing based on the vibration signal that is of the vibration bone of the vocal part and that is obtained by the bone conduction sensor 180M, to implement a voice function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or may be a touch-sensitive button. The mobile phone 100 may receive a button input, and generate a button signal input related to a user setting and function control of the mobile phone 100.

The motor 191 may generate a vibration prompt. The motor 191 may be configured to provide an incoming call vibration prompt or a touch vibration feedback. For example, touch operations performed on different applications (for example, photographing and audio playing) may correspond to different vibration feedback effects. The motor 191 may also correspond to different vibration feedback effects for touch operations performed on different areas of the display 194. Different application scenarios (for example, a time reminder, information receiving, an alarm clock, and a game) may also correspond to different vibration feedback effects. A touch vibration feedback effect may be further customized.

The indicator 192 may be an indicator, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or plugged from the SIM card interface 195, to implement contact with or separation from the mobile phone 100. The mobile phone 100 may support one or N SIM card interfaces, where N is a positive integer greater than 1. The SIM card interface 195 can support a nano-SIM card, a micro-SIM card, a SIM card, and the like. A plurality of cards may be simultaneously inserted into a same SIM card interface 195. The plurality of cards may be of a same type, or may be of different types. The SIM card interface 195 may be compatible with different types of SIM cards. The SIM card interface 195 may also be compatible with the external memory card. The mobile phone 100 interacts with a network by using the SIM card, to implement functions such as calling and data communication. In some embodiments, the mobile phone 100 uses an eSIM, that is, an embedded SIM card. The eSIM card may be embedded in the mobile phone 100, and cannot be separated from the mobile phone 100.

It can be understood that, in the embodiments of this application, the terminal device (for example, the mobile phone) may perform some or all steps in this embodiment of this application. These steps or operations are merely examples. In the embodiments of this application, another operation or variations of various operations may be performed. In addition, the steps may be performed in a sequence different from a sequence presented in embodiments of this application, and not all the operations in embodiments of this application are necessarily to be performed. Embodiments of this application may be implemented separately, or may be implemented in any combination. This is not limited in this application.

In this embodiment of this application, signal compensation may be performed on the input signal of the speaker to improve sound quality of the speaker, or displacement protection may be performed on the speaker to improve sound quality of the speaker, or displacement protection may be performed on the speaker and signal compensation may be performed on the input signal of the speaker to improve sound quality of the speaker.

The following describes in detail a method for improving sound quality of a speaker in an embodiment of this application.

Figure 2:
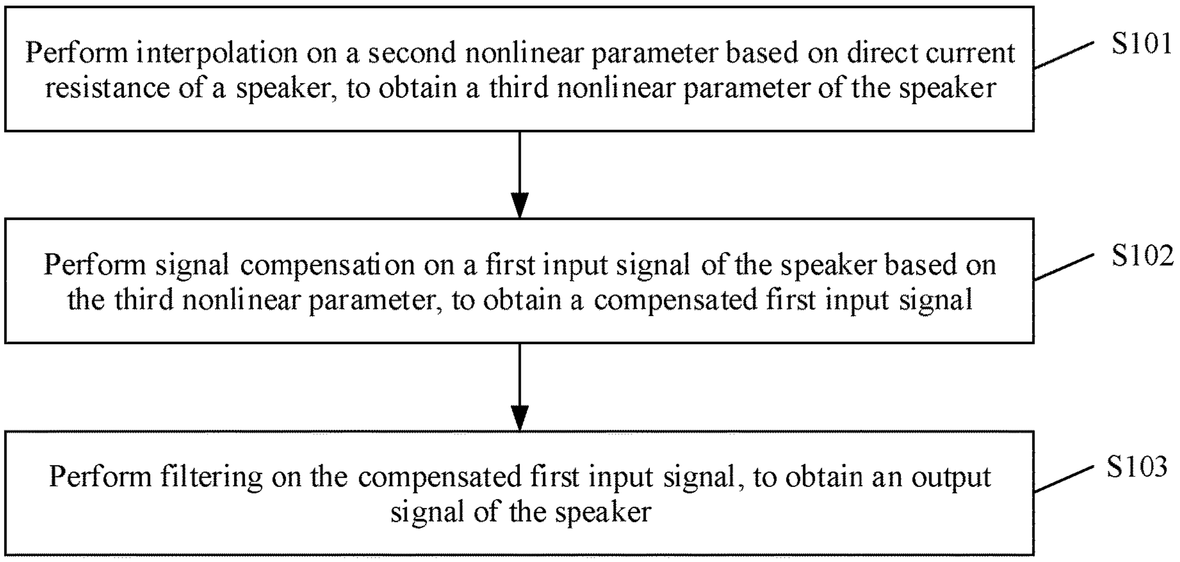
FIG. 2 is a schematic diagram 1 of a speaker improvement method according to an embodiment of this application.

As shown in FIG. 2, when nonlinear compensation is performed on an input signal of a speaker to improve sound quality of the speaker, the method for improving sound quality of a speaker in this embodiment of this application may include S101 to S103.

S101: Perform interpolation on a second nonlinear parameter based on direct current resistance of the speaker, to obtain a third nonlinear parameter of the speaker.

The second nonlinear parameter is a nonlinear parameter preconfigured in the speaker, and the direct current resistance of the speaker is direct current resistance of a coil of the speaker.

Optionally, in this embodiment of this application, the second nonlinear parameter may be obtained by adjusting a first nonlinear parameter of the speaker, and the first nonlinear parameter is a nonlinear parameter of the speaker in an original state (which can be understood as a state in which the speaker is manufactured and is not put into use). Before delivery of the speaker, the first nonlinear parameter of the speaker is first adjusted, a parameter of the speaker is adjusted from the first nonlinear parameter to the second nonlinear parameter, and then the speaker is delivered and is put into use.

In this embodiment of this application, a nonlinear parameter of the speaker (for example, the first nonlinear parameter, the second nonlinear parameter, and the third nonlinear parameter) includes at least one of a force factor, mechanical stiffness, inductance, and damping of the speaker.

Figure 3:
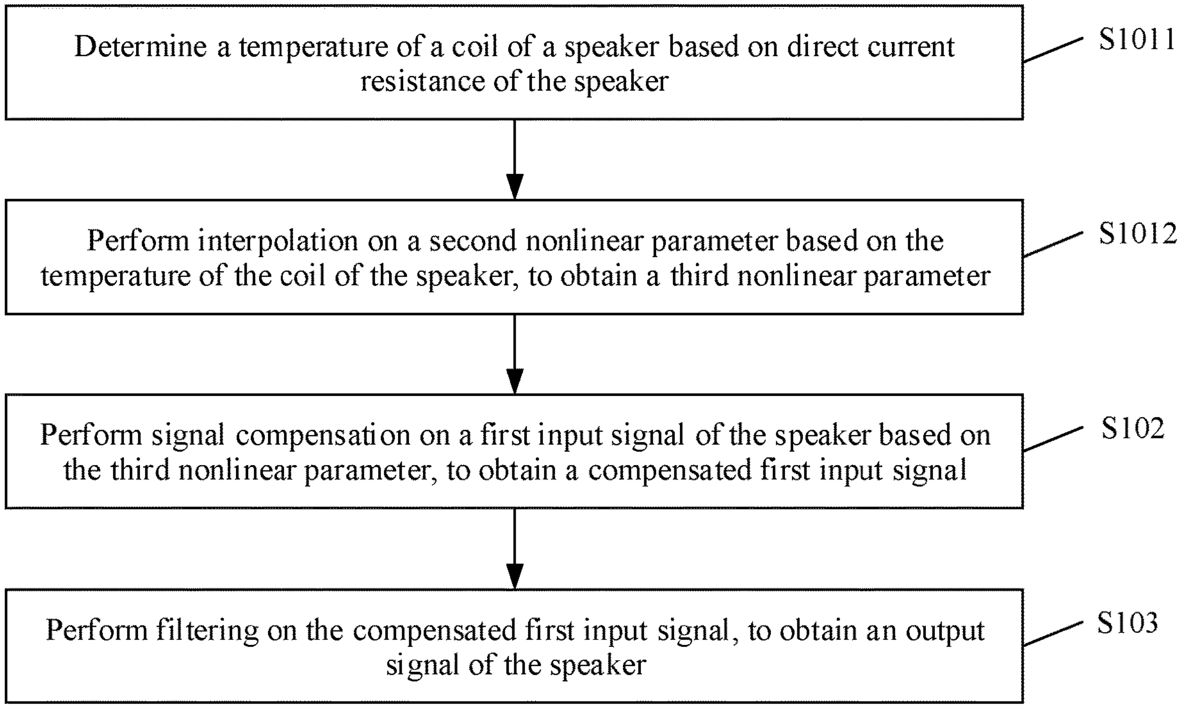
FIG. 3 is a schematic diagram 2 of a speaker improvement method according to an embodiment of this application.

Optionally, with reference to FIG. 2, as shown in FIG. 3, S101 may be specifically implemented by using S1011 and S1012.

S1011: Determine a temperature of the coil of the speaker based on the direct current resistance of the speaker.

In this embodiment of this application, an output signal of the speaker, the second nonlinear parameter, and the linear parameter of the speaker are entered into a speaker model, to obtain the direct current resistance of the speaker and a current, displacement, and a velocity that exist at a current moment. The current, the displacement, and the velocity that exist at the current moment are used to perform signal compensation on a next signal in the input signal.

Optionally, in this embodiment of this application, the speaker model may be a model in the conventional technology. Details are not described in this embodiment of this application.

In this embodiment of this application, a relationship between the temperature of the coil (which may also be referred to as a temperature of a voice coil) of the speaker and the direct current resistance of the coil of the speaker is as follows:

$$T = \frac{1}{\eta}\left(\frac{R}{R_0} - 1\right) + 25$$

Herein, T is the temperature of the coil of the speaker, R is the direct current resistance of the coil of the speaker, η is a temperature rise coefficient, $R_o$ is direct current resistance of the coil that corresponds to a calibration temperature, and the temperature of the voice coil is usually calibrated at 25 degrees Celsius.

After the direct current resistance of the speaker is obtained, the temperature of the coil of the speaker may be obtained based on the foregoing formula.

S1012: Perform interpolation on the second nonlinear parameter based on the temperature of the coil of the speaker, to obtain the third nonlinear parameter.

A nonlinear parameter, for example, a nonlinear parameter Kms(x) in the second nonlinear parameter is used as an example to describe a process of performing interpolation on the second nonlinear parameter to obtain the third nonlinear parameter.

First, characteristic curves of the nonlinear parameter Kms(x) that exist when the temperature of the coil of the speaker has different temperature values are obtained. The characteristic curve of Kms(x) is a curve reflecting a relationship between a stiffness coefficient of the speaker and displacement of the speaker. For example, 10 characteristic curves of Kms(x) from 10 degrees Celsius to 55 degrees Celsius are obtained at an interval of 5 degrees Celsius, and data of the 10 characteristic curves is stored.

Second, linear interpolation is performed on the characteristic curve of the nonlinear parameter Kms(x) based on the temperature of the coil of the speaker, a temperature threshold 1, and a temperature threshold 2, to obtain a target characteristic curve (the target characteristic curve may be understood as an estimation result of a characteristic curve of the third nonlinear parameter). The temperature threshold 2 is greater than the temperature threshold 1, and the third nonlinear parameter may be understood as a nonlinear parameter corresponding to a current temperature of the coil of the speaker.

For example, the temperature of the coil of the speaker is denoted as T, the temperature threshold 1 is denoted as $T_{min}$, and the temperature threshold 2 is denoted as $T_{max}$.

If $T<T_{min}$, a characteristic curve corresponding to is used as the target characteristic curve.

If $T>T_{max}$, a characteristic curve corresponding to $T_{max}$ is used as the target characteristic curve.

If $T_{min} \leq T \leq T_{max}$, linear interpolation is performed on a characteristic curve corresponding to and a characteristic curve corresponding to $T_{max}$ based on the temperature of the coil of the speaker, to generate the target characteristic curve.

Finally, polynomial fitting is performed on the target characteristic curve, to obtain each coefficient of a polynomial corresponding to the target characteristic curve. Each coefficient is in a one-to-one correspondence with a nonlinear parameter. Therefore, the third nonlinear parameter may be determined based on each coefficient of the polynomial.

For example, for the nonlinear parameter Kms(x), it is assumed that a binomial obtained through fitting is:

$$f(x) = a_0 + a_1x + a_2x^2 + a_3x^3 + a_4x^4$$

Herein, a coefficient $a_1$ corresponds to a first order coefficient of the nonlinear parameter Kms(x), a coefficient $a_2$ corresponds to a second order coefficient of the nonlinear parameter Kms(x), a coefficient $a_3$ corresponds to a third order coefficient of the nonlinear parameter Kms(x), and a coefficient $a_4$ corresponds to a fourth order coefficient of the nonlinear parameter Kms(x).

A parameter of another type in the third nonlinear parameter, for example, Rm(v), may also be obtained by using a method similar to the linear interpolation method. Details are not described in this embodiment of this application.

Optionally, the characteristic curve of the nonlinear parameter may be data in a form of a table, or may be data or a file in another form. This is not limited in this embodiment of this application.

The nonlinear parameter of the speaker may change in real time. For example, the nonlinear parameter changes with the temperature of the voice coil of the speaker. In this embodiment of this application, interpolation is performed on the second nonlinear parameter of the speaker based on current direct current resistance of the speaker, to obtain nonlinear resistance (that is, third nonlinear resistance) of the speaker in real time. The third nonlinear parameter has high accuracy.

It should be understood that the nonlinear parameter of the speaker may also change with the displacement of the speaker. In this embodiment of this application, a similar linear interpolation method may be used to determine the displacement of the speaker based on the direct current resistance of the speaker, and then interpolation is performed on the second nonlinear parameter of the speaker based on the displacement of the speaker, to obtain the third nonlinear parameter of the speaker. In this case, different from S1012, a characteristic curve of the second nonlinear parameter is a characteristic curve corresponding to different displacement.

S102: Perform signal compensation on a first input signal of the speaker based on the third nonlinear parameter, to obtain a compensated first input signal.

Specifically, the performing signal compensation on a first input signal of the speaker based on the third nonlinear parameter includes: entering, into a signal compensation model, the first input signal, the third nonlinear parameter, the linear parameter of the speaker, and a current, displacement, and a velocity that are obtained at a previous moment, to obtain the compensated first input signal.

In this embodiment of this application, the determined third nonlinear parameter of the speaker has high accuracy. Therefore, signal compensation is performed on the first input signal based on the third nonlinear parameter, so that there is a good signal compensation effect, and impact of the nonlinear parameter on the input signal can be effectively reduced.

S103: Perform filtering on the compensated first input signal, to obtain the output signal of the speaker.

In this embodiment of this application, the compensated first input signal is denoted as a first signal, and a filtering process of the compensated first input signal includes A1 to A5.

A1: Perform filtering on the first signal by using a wavetrap, to obtain a second signal.

Optionally, a function expression of the wavetrap may be as follows:

$$H_z(Z)=(a_1+a_2z^{-1}+a_3z^{-2})/(b_1+b_2z^{-1}+b_3z^{-2})$$

Herein, $a_1$, $a_2$, $a_3$, $b_1$, $b_2$, and $b_3$ are filtering coefficients of the wavetrap.

$$a_1=0.5*(1+\mu),\ a_2=-\beta*(1+\mu),\ a_3=0.5*(1+\mu)$$

$$b_1=1,\ b_2=-\beta*(1+\mu),\text{ and } b_3=\mu$$

Herein, $$\beta=\cos w_0,\ \mu=\left(1+\tan\left(\frac{w_0}{2}\right)^2-\tan\left(\frac{B_w}{2}\right)\right)\Big/\left(1+\tan\left(\frac{w_0}{2}\right)^2+\tan\left(\frac{B_w}{2}\right)\right),$$

and $$w_0=2*\pi*\frac{f_0}{f_s}.$$

Herein, $f_0$ is a resonant frequency of the speaker, $f_s$ is a sampling frequency, and $B_w$ is a digital bandwidth coefficient.

A2: Calculate a difference between the first signal and the second signal, to obtain a third signal.

A3: Multiply the third signal by a filtering gain, to obtain a fourth signal.

The filtering gain is used to perform filtering on the compensated first input signal.

A4: Calculate a difference between the first signal and the fourth signal, to obtain a fifth signal, and use the fifth signal as the output signal of the speaker.

In this embodiment of this application, filtering is performed on the first input signal, to adjust a velocity that is of a diaphragm of the speaker and that exists near the resonant frequency, so that distortion of the output signal is further reduced, and the sound quality of the speaker can be effectively improved.

In this embodiment of this application, the filtering gain may be generated based on the input signal. Specifically, generating the filtering gain may include S1 and S2.

S1: Determine a maximum value of an absolute voltage value in a current frame.

It should be understood that the first input signal includes a plurality of signal frames, each signal frame includes a plurality of input voltages, and a voltage with a largest absolute value in the plurality of input voltages is the maximum value of the absolute voltage value in the current frame.

S2: Determine the filtering gain based on the maximum value of the absolute voltage value.

In this embodiment of this application, the maximum value of the absolute voltage value is denoted as $U_{max}$, the filtering gain is denoted as α, and the determining the filtering gain based on the maximum value of the absolute voltage value includes:

$$\text{When } U_{max}<U_{lowlimit},$$

$$\alpha=\alpha_{buffer}*\alpha_{smooth},$$

where $U_{lowlimit}$ is a voltage control lower limit, $\alpha_{buffer}$ is a filtering gain corresponding to a previous frame, $\alpha_{smooth}$ is a smoothing coefficient of the filtering gain, and * represents convolution;

$$\text{when } U_{uplimit}\le U_{max}\le U_{lowlimit},$$

$$\alpha=\alpha_{buffer}*\alpha_{smooth}+\frac{U_{max}-U_{lowlimit}}{U_{uplimit}-U_{lowlimit}}*(\alpha_{uplimit}-\alpha_{lowlimit})*(1-\alpha_{smooth}),$$

where $U_{uplimit}$ is a voltage control upper limit, $\alpha_{uplimit}$ is a control upper limit of the filtering gain, and $\alpha_{lowlimit}$ is a control lower limit of the filtering gain; or $$\text{when } U_{max}>U_{uplimit},$$

$$\alpha=\alpha_{buffer}*\alpha_{smooth}+\alpha_{uplimit}*(1-\alpha_{smooth})$$

Figure 4:
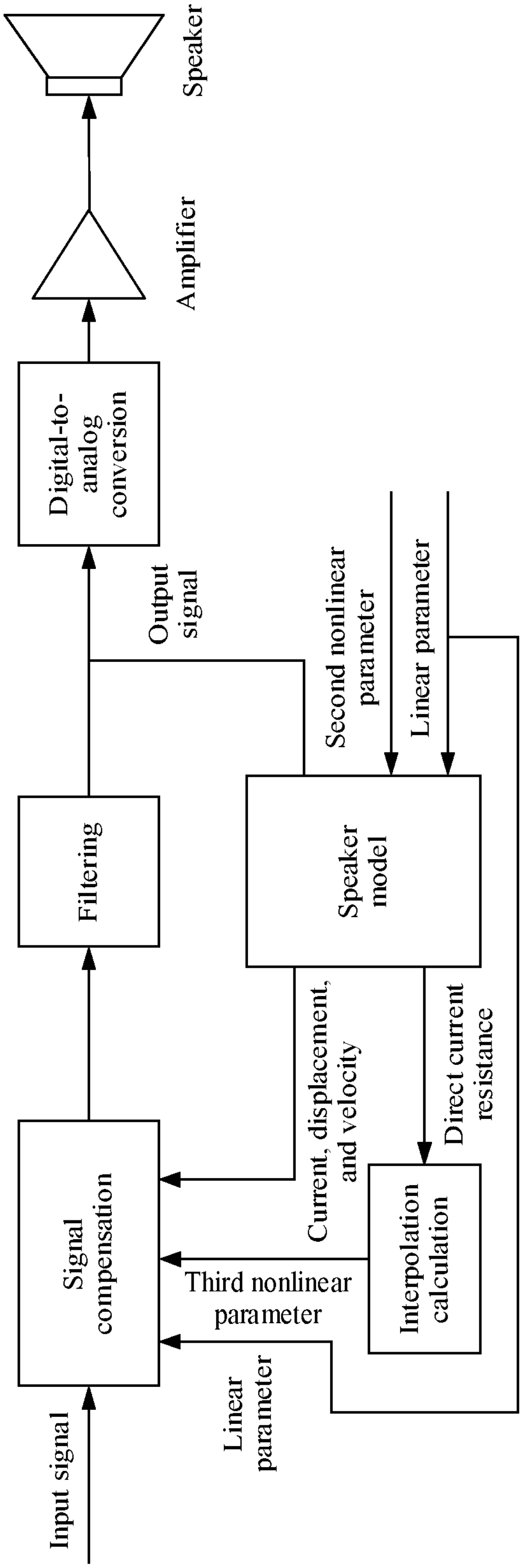
FIG. 4 is a flow block diagram 1 of a method for improving sound quality of a speaker according to an embodiment of this application.

Therefore, nonlinear compensation performed on the first input signal of the speaker is completed, and the output signal of the speaker is obtained for outputting. FIG. 4 is a flow block diagram of a method for improving sound quality of a speaker through signal compensation.

Figure 5:
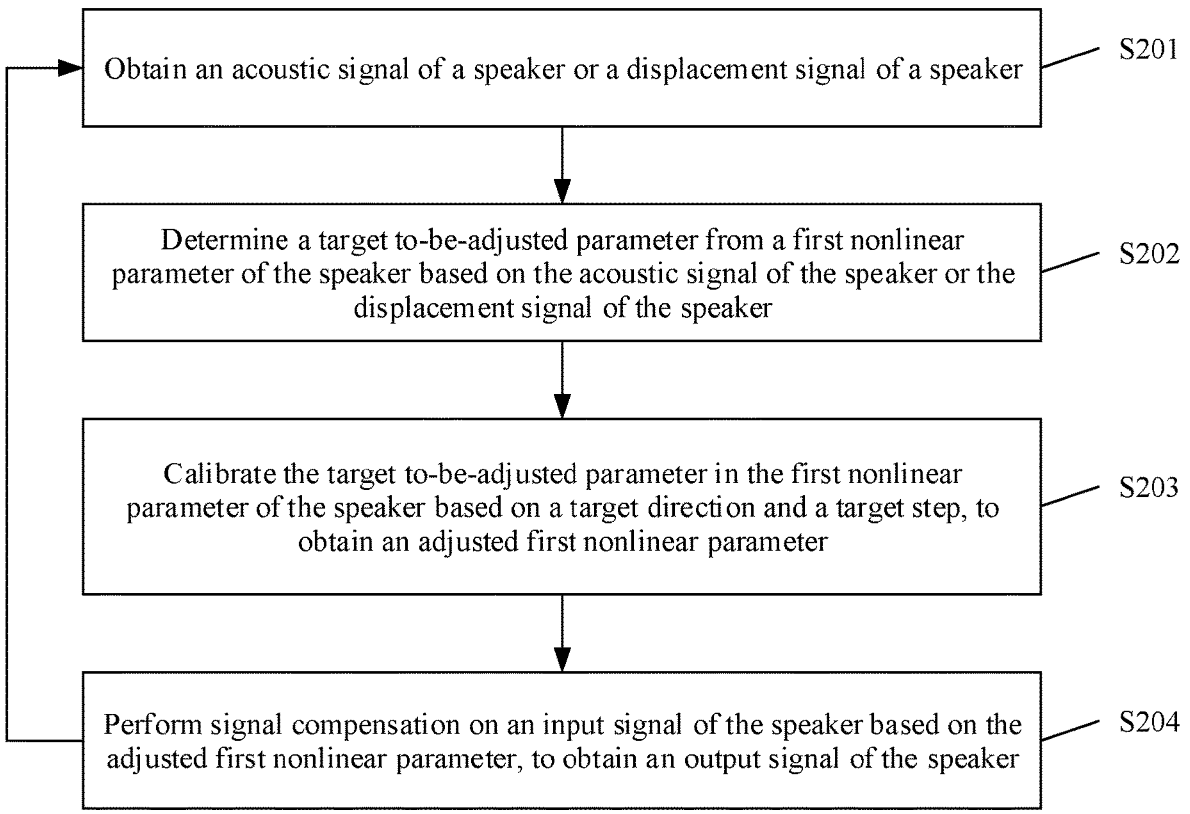
FIG. 5 is a schematic diagram of a method for adjusting a nonlinear parameter of a speaker according to an embodiment of this application.

Optionally, in an embodiment of this application, a first nonlinear parameter of a speaker may be adjusted based on an acoustic signal of the speaker or a displacement signal of the speaker, to obtain a second nonlinear parameter of the speaker. Specifically, as shown in FIG. 5, the first nonlinear parameter of the speaker is adjusted by cyclically performing S201 to S204.

S201: Obtain the acoustic signal of the speaker or the displacement signal of the speaker.

In this embodiment of this application, for an input signal, an acoustic signal output by the speaker or a displacement signal of the speaker may be collected. Optionally, the input signal may be a sweep signal or a chirp signal. This is not limited in this embodiment of this application.

For an input signal $U_{in}(n)$ of the speaker, the signal $U_{in}(n)$, a nonlinear parameter $Pn(t_{n-1})$ obtained at a previous moment, a linear parameter $Pi(t_{n-1})$, and a current i(n−1), displacement x(n−1), and a velocity v(n−1) that are obtained at the previous moment are input into a nonlinear compensation model, to obtain an output signal $U_{out}(n)$, so as to collect an acoustic signal or a displacement signal corresponding to the output signal.

The current i(n−1), the displacement x(n−1), and the velocity v(n−1) that are obtained at the previous moment are obtained by feeding back, to a speaker model, an output signal $U_{out}(n-1)$ existing at the previous moment. Specifically, the output signal $U_{out}(n-1)$ existing at the previous moment, the nonlinear parameter $Pn(t_{n-1})$ obtained at the previous moment, and the linear parameter $Pi(t_{n-1})$ are input into the speaker model, to obtain the current i(n−1), the displacement x(n−1), and the velocity v(n−1).

Optionally, in this embodiment of this application, the speaker model may be an existing speaker model, and the speaker model is not described in detail herein.

S202: Determine a target to-be-adjusted parameter from the first nonlinear parameter of the speaker based on the acoustic signal of the speaker or the displacement signal of the speaker.

Specifically, S202 may be implemented by using S2021 to S2023.

S2021: Perform Fourier transform on the acoustic signal of the speaker or the displacement signal of the speaker, to obtain harmonic distortion.

A Fourier transform result of the acoustic signal or the displacement signal may include N order harmonic distortion. In this embodiment of this application, a nonlinear parameter of the speaker is in a one-to-one correspondence with each order of harmonic distortion in the Fourier transform result of the acoustic signal or the displacement signal. Table 1 shows an example of a correspondence between a nonlinear parameter and harmonic distortion.

TABLE 1

| Harmonic distortion | Nonlinear parameter |
|---|---|
| Second order harmonic distortion | First order coefficient of BL(x), and first order coefficient of Kms(x) |
| Third order harmonic distortion | Second order coefficient of BL(x), and second order coefficient of Kms(x) |
| Fourth order harmonic distortion | Third order coefficient of BL(x), and third order coefficient of Kms(x) |
| Fifth order harmonic distortion | Fourth order coefficient of BL(x), and fourth order coefficient of Kms(x) |

S2022: Determine a candidate to-be-adjusted parameter from the first nonlinear parameter of the speaker based on the harmonic distortion.

In this embodiment of this application, harmonic distortion in a Fourier transform result corresponding to an acoustic signal or a displacement signal collected after signal compensation is performed on an input signal is referred to as first harmonic distortion, and harmonic distortion in a Fourier transform result corresponding to an acoustic signal or a displacement signal collected before compensation is performed on an input signal is referred to as second harmonic distortion. Therefore, the determining a candidate to-be-adjusted parameter from the first nonlinear parameter of the speaker may include: determining the candidate to-be-adjusted parameter based on the first harmonic distortion and the second harmonic distortion. The determining the candidate to-be-adjusted parameter based on the first harmonic distortion and the second harmonic distortion specifically includes the following steps.

Step 1: Determine a ratio of each order of harmonic distortion in the second harmonic distortion to each corresponding order harmonic distortion in the first harmonic distortion.

For example, it is assumed that the first harmonic distortion includes second order harmonic distortion to fifth order harmonic distortion, and similarly, the second harmonic distortion also includes second order harmonic distortion to fifth order harmonic distortion. A ratio of the second order harmonic distortion in the second harmonic distortion to the second order harmonic distortion in the first harmonic distortion is calculated, and is recorded as a ratio 1, and a ratio 2, a ratio 3, and a ratio 4 are obtained by analogy. Table 2 shows an example of a correspondence among a nonlinear parameter, each order of harmonic distortion, and a ratio of each order of harmonic distortion.

TABLE 2

| Nonlinear parameter | Each order of harmonic distortion | A ratio of each order of harmonic distortion |
|---|---|---|
| First order coefficient of BL(x), and first order coefficient of Kms(x) | Second order harmonic distortion | Ratio 1 |
| Second order coefficient of BL(x), and second order coefficient of Kms(x) | Third order harmonic distortion | Ratio 2 |
| Third order coefficient of BL(x), and third order coefficient of Kms(x) | Fourth order harmonic distortion | Ratio 3 |
| Fourth order coefficient of BL(x), and fourth order coefficient of Kms(x) | Fifth order harmonic distortion | Ratio 4 |

Step 2: Determine, as the candidate to-be-adjusted parameter, a nonlinear parameter corresponding to each ratio that is of harmonic distortion and that is greater than a preset threshold.

Optionally, in this embodiment of this application, the preset threshold may be determined based on an actual use requirement, and each order of harmonic distortion may correspond to a same or different preset threshold. This is not limited in this embodiment of this application.

For example, it is assumed that a threshold corresponding to the second order harmonic is denoted as a preset threshold 1, a threshold corresponding to the third order harmonic is denoted as a preset threshold 2, a threshold corresponding to the fourth order harmonic is denoted as a preset threshold 3, and a threshold corresponding to the fifth order harmonic is denoted as a preset threshold 4. When a ratio of the second order harmonic distortion is greater than the preset threshold 1, and a ratio of the fourth order harmonic distortion is greater than the preset threshold 3, the first order coefficient of BL(x), the first order coefficient of Kms(x), the third order coefficient of BL(x), and the third order coefficient of Kms(x) may be determined as candidate to-be-adjusted parameters.

S2023: Determine the target to-be-adjusted parameter from the candidate to-be-adjusted parameter.

In this embodiment of this application, after the candidate to-be-adjusted parameter is determined, a convergence error of each nonlinear parameter in the candidate to-be-adjusted parameter is obtained, the convergence error of each nonlinear parameter in the candidate to-be-adjusted parameter is compared with a preset error threshold corresponding to each nonlinear parameter, and each nonlinear parameter whose convergence error is greater than the error threshold in the candidate to-be-adjusted parameter is determined as the target to-be-adjusted parameter.

Optionally, in this embodiment of this application, the preset error threshold may be determined based on an actual use requirement, and each nonlinear parameter may correspond to a same or different preset error threshold. This is not limited in this embodiment of this application.

For example, with reference to the example in step 2, determined candidate to-be-adjusted parameters are the first order coefficient of BL(x), the first order coefficient of Kms(x), the third order coefficient of BL(x), and the third order coefficient of Kms(x). A preset error threshold corresponding to the first order coefficient of BL(x) is denoted as a preset error threshold 1, a preset error threshold corresponding to the first order coefficient of Kms(x) is denoted as a preset error threshold 2, a preset error threshold corresponding to the third order coefficient of BL(x) is denoted as a preset error threshold 3, and a preset error threshold corresponding to the third order coefficient of Kms(x) is denoted as a preset error threshold 4. A convergence error of the first order coefficient of BL(x) is greater than the preset error threshold 1, and a convergence error of the third order coefficient of Kms(x) is greater than the preset error threshold 4. Therefore, the first order coefficient of BL(x) and the third order coefficient of Kms(x) are determined as target to-be-adjusted parameters, and another nonlinear parameter does not need to be adjusted.

S203: Calibrate the target to-be-adjusted parameter in the first nonlinear parameter of the speaker based on a target direction and a target step, to obtain an adjusted first nonlinear parameter.

In this embodiment of this application, the target direction may include a forward direction and a reverse direction. The forward direction may be defined as a direction in which the nonlinear parameter is increased, and the reverse direction may be defined as a direction in which the nonlinear parameter is decreased. The target direction may be specifically defined based on an actual requirement. This is not limited in this embodiment of this application.

The target step represents an adjustment (increase or decrease) amplitude of the nonlinear parameter, and the target step may include a target step corresponding to the forward direction and a target step corresponding to the reverse direction.

Optionally, the target step corresponding to the forward direction may be the same as or different from the target step corresponding to the reverse direction. This is not specifically limited in this embodiment of this application. For example, the nonlinear parameter is adjusted in the forward direction, a corresponding target step is set to 5%, the nonlinear parameter is adjusted in the reverse direction, and a corresponding step is set to 10%.

Optionally, in this embodiment of this application, when the first nonlinear parameter includes a plurality of nonlinear parameters, different nonlinear parameters may correspond to a same target step or different target steps. This is not specifically limited in this embodiment of this application. For example, it is assumed that nonlinear parameters include BL(x), Kms(x), and Le(x). Table 3 shows an example of a target step corresponding to each nonlinear parameter.

TABLE 3

| First nonlinear parameter | Target direction | Target step |
|---|---|---|
| BL(x) | Forward direction | 2% |
| | Reverse direction | 2% |
| Kms(x) | Forward direction | 3% |
| | Reverse direction | 4% |
| Le(x) | Forward direction | 3% |
| | Reverse direction | 4% |

It should be understood that, after the target to-be-adjusted parameter in the first nonlinear parameter is adjusted, the adjusted first nonlinear parameter is obtained. Further, a convergence error of the first nonlinear parameter is updated based on the adjusted first nonlinear parameter, so that the updated convergence error is used for a corresponding step in a subsequent cycle.

S204: Perform signal compensation on an input signal of the speaker based on the adjusted first nonlinear parameter, to obtain an output signal of the speaker.

Figure 6:
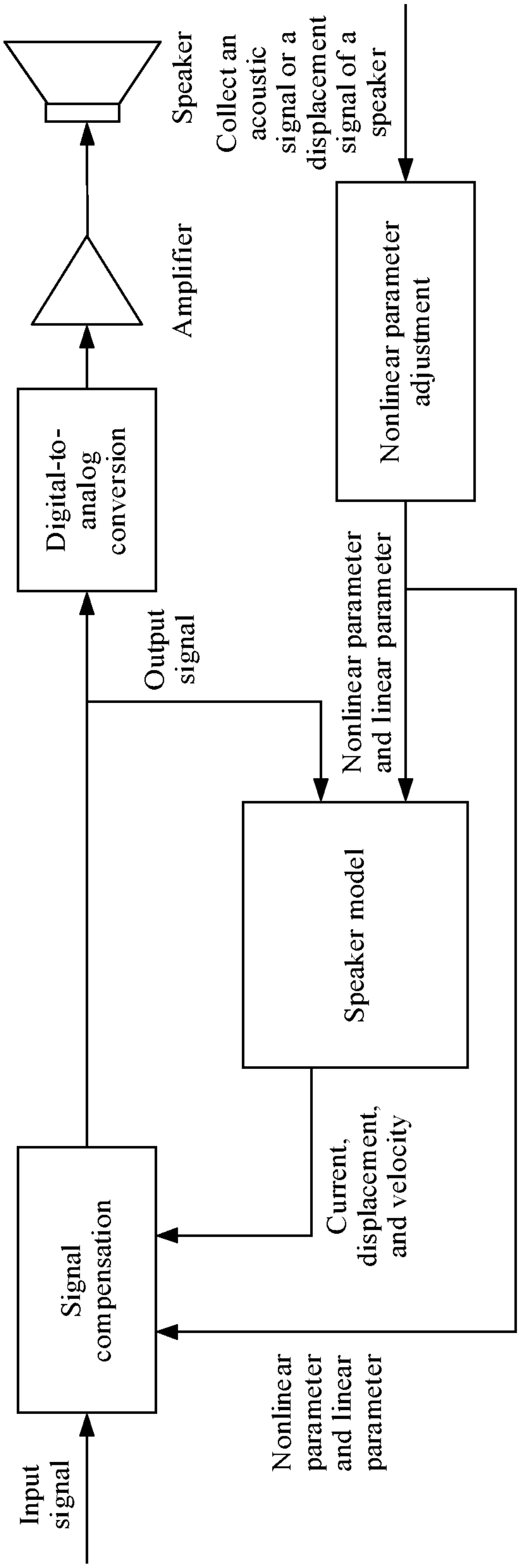
FIG. 6 is a flow block diagram of a method for adjusting a nonlinear parameter of a speaker according to an embodiment of this application.

It can be understood that, after signal compensation is performed on the input signal of the speaker to obtain the output signal of the speaker, S201 is performed. To be specific, for the output signal, an acoustic signal or a displacement signal of the speaker is obtained. FIG. 6 is a flow block diagram of a method for adjusting a parameter of a speaker.

The first nonlinear parameter is adjusted, to obtain the adjusted first nonlinear parameter. Therefore, a value of the first nonlinear parameter of the speaker is updated to a value of the adjusted first nonlinear parameter (in other words, the value of the adjusted nonlinear parameter is used to replace the value of the first nonlinear parameter existing before adjustment). Then, the target to-be-adjusted parameter is determined from the first nonlinear parameter based on the acoustic signal of the speaker or the displacement signal of the speaker (the first nonlinear parameter herein is the updated first nonlinear parameter). For a specific process, refer to related descriptions in the foregoing embodiment. Details are not described herein again.

In conclusion, S201 to S204 are cyclically performed, and an adjusted first nonlinear parameter obtained in the last cycle is used as the second nonlinear parameter.

Optionally, in an embodiment of this application, a first nonlinear parameter is obtained through measurement. Specifically, S301 to S305 may be cyclically performed, to obtain a first nonlinear parameter of a speaker.

S301: Input an input current, a nonlinear parameter, and a linear parameter into a lumped-loudspeaker model, to obtain a predicted voltage of the speaker.

In this embodiment of this application, the input current is a current generated by the speaker under a driving action of an input signal, and the input signal is an input voltage. For ease of description, the input voltage is referred to as an actual voltage in the following embodiment.

It should be understood that, in a first cycle, the nonlinear parameter and the linear parameter in S301 are initialized parameters, and optionally, may be a randomly initialized nonlinear parameter and linear parameter. The nonlinear parameter and the linear parameter in S301 in a subsequent cycle are a nonlinear parameter and a linear parameter that are obtained in a previous cycle.

S302: Obtain an error signal based on the actual voltage and the predicted voltage.

The error signal is a difference between the actual voltage and the predicted voltage.

S303: Input the error signal and the input current into a linear parameter identification model, to obtain a linear parameter of the speaker.

S304: Decorrelate the error signal, to obtain a decorrelated error signal.

In this embodiment of this application, the decorrelating the error signal is to remove a linear signal from the error signal. Optionally, the error signal may be decorrelated in a decorrelation method (by using a decorrelation model) in the conventional technology. This is not limited in this embodiment of this application.

S305: Input the decorrelated error signal and the input current into a nonlinear parameter identification model, to obtain a nonlinear parameter of the speaker.

Optionally, in this embodiment of this application, the lumped-speaker model, the linear parameter identification model, and the nonlinear parameter identification model may all be models provided in the conventional technology. This is not limited in this embodiment of this application.

It should be understood that, a linear parameter corresponding to a current cycle is obtained in S304, a nonlinear parameter corresponding to the current cycle is obtained in S305, and then a next input current, the linear parameter obtained in the current cycle, and the nonlinear parameter obtained in the current cycle are input into the lumped-speaker model, to obtain the predicted voltage. In other words, S301 to S305 continue to be performed until a preset quantity of cycles is reached, or the nonlinear parameter and the linear parameter converge until a preset tolerant error is obtained, to obtain a final linear parameter and a nonlinear parameter, and a finally obtained nonlinear parameter is used as the first nonlinear parameter.

It should be noted that, S301 to S305 are cyclically performed, to obtain a convergence error of a nonlinear parameter. It should be understood that the convergence error of the nonlinear parameter includes a convergence error corresponding to each parameter in the nonlinear parameter.

In the method for improving sound quality of a speaker in this embodiment of this application, interpolation may be performed on the second nonlinear parameter of the speaker based on direct current resistance of the speaker, to obtain a third nonlinear parameter of the speaker; signal compensation is performed on a first input signal of the speaker based on the third nonlinear parameter, to obtain a compensated first input signal; and filtering is performed on the compensated first input signal, to obtain an output signal of the speaker. The third nonlinear parameter is obtained by performing interpolation on the second nonlinear parameter based on the direct current resistance of the speaker. The nonlinear parameter (that is, the third nonlinear parameter) is a nonlinear parameter corresponding to a current working state of the speaker, in other words, is a real-time nonlinear parameter. The nonlinear parameter has high accuracy. Therefore, signal compensation can be more effectively performed on the first input signal of the speaker based on the third nonlinear parameter, and filtering is performed on the compensated first input signal, to further reduce signal distortion. In this way, the sound quality of the speaker can be effectively improved.

Figure 7:
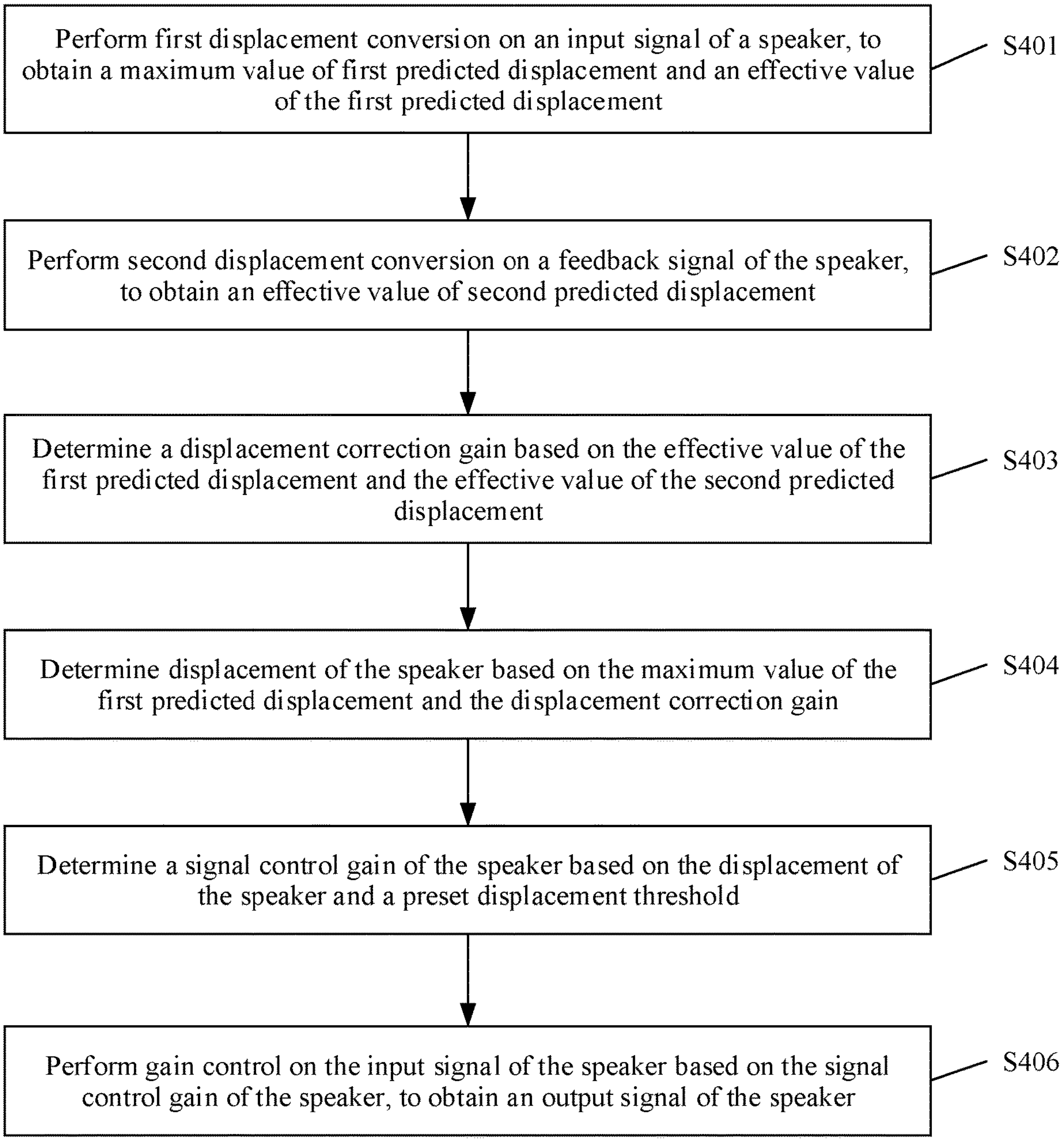
FIG. 7 is a schematic diagram 3 of a speaker improvement method according to an embodiment of this application.

As shown in FIG. 7, displacement protection is performed on a speaker, to improve sound quality of the speaker. A method for improving sound quality of a speaker in this embodiment of this application may include S401 to S406.

S401: Perform first displacement conversion on an input signal of the speaker, to obtain a maximum value of first predicted displacement and an effective value of the first predicted displacement.

For example, an input signal $U_{in}(t_n)$ that is of the speaker and that exists at a current moment (a moment $t_n$) is used as an example. It should be noted that in the following embodiment, the $n^{th}$ frame of signal in the input signal that is of the speaker and that corresponds to the moment $t_n$ is the $n^{th}$ frame of signal corresponding to $U_{in}(t_n)$.

The effective value of the first predicted displacement is calculated based on the following formula:

$$X_{mean\_ts}(t_n) = \text{mean}[H_{ux}(t_{n-1}) * U_{in}(t_n)]$$

Herein, $X_{mean\_ts}(t_n)$ represents the effective value of the first predicted displacement, $H_{ux}(t_{n-1})$ is a mathematical model for performing first displacement conversion, and may also be referred to as a displacement transfer function of the speaker, mean represents calculating an effective value, and * represents convolution.

The maximum value of the first predicted displacement is calculated based on the following formula:

$$X_{max\_ts}(t_n) = \max[H_{ux}(t_{n-1}) * U_{in}(t_n)]$$

Herein, $X_{max\_ts}(t_n)$ represents the maximum value of the first predicted displacement, max represents calculating a maximum value, and * represents convolution.

In this embodiment of this application, a feedback signal (a feedback voltage) that is of the speaker and that exists at a previous moment may be input into a linear parameter identification model, to obtain a linear parameter of the speaker, and further, the displacement transfer function is updated based on the linear parameter.

Optionally, the displacement transfer function is as follows:

$$H_{ux}(t_{n-1}) = L^{-1}\left\{\frac{BL(t_{n-1})}{(R_e(t_{n-1}) + L_e(t_{n-1})S)(M_{ms}(t_{n-1})S^2 + R_{ms}(t_{n-1})S + K_{ms}(t_{n-1})) + BL^2(t_{n-1})S}\right\}$$

$$P(t_{n-1}) = [BL(t_{n-1}), R_e(t_{n-1}), L_e(t_{n-1}), M_{ms}(t_{n-1}), R_{ms}(t_{n-1}), K_{ms}(t_{n-1})]$$

Herein, $L^{-1}$ represents inverse Laplace transform, and $P(t_{n-1})$ represents the linear parameters of the speaker.

In this embodiment of this application, the displacement transfer function of the speaker may alternatively be a transfer function of another type, and is not limited to a function type shown in the foregoing formula.

S402: Perform second displacement conversion on the feedback signal of the speaker, to obtain an effective value of second predicted displacement.

The feedback signal of the speaker includes a feedback current and the feedback voltage.

For example, the input signal $U_{in}(n)$ that is of the speaker and that exists at the current moment $(t_n)$ is used as an example, and the effective value of the second predicted displacement is calculated based on the following formula:

$$X_{mean\_emf}(t_n) = \text{mean}\left[\int_0^T \frac{U_m(t_{n-1}) - R_e(t_{n-1})I_m(t_{n-1}) - L_e(t_{n-1})\frac{dI_m(t_{n-1})}{dt}}{BL(t_{n-1})}dt\right]$$

Herein, $X_{mean\_enf}(t_n)$ represents the effective value of the second predicted displacement, $U_m(t_{n-1})$ represents the feedback voltage (that is, a voltage output at the previous moment), and $I_m(t_{n-1})$ represents the feedback current (that is, a current output at the previous moment $(t_{n-1})$).

A mathematical model for the second displacement conversion (which may also be referred to as an induced electromotive force model of the speaker) may be as follows:

$$\int_0^T \frac{U_m(t_{n-1}) - R_e(t_{n-1})I_m(t_{n-1}) - L_e(t_{n-1})\frac{dI_m(t_{n-1})}{dt}}{BL(t_{n-1})}dt$$

Herein, $R_e(t_{n-1})$ is direct current resistance.

In this embodiment of this application, similarly, the feedback signal (the feedback voltage $U_m(t_{n-1})$) that is of the speaker and that exists at the previous moment may be input into the linear parameter identification model, to obtain the linear parameter $P(t_{n-1})$ of the speaker, and further, the induced electromotive force model of the speaker is updated based on the linear parameter.

S403: Determine a displacement correction gain based on the effective value of the first predicted displacement and the effective value of the second predicted displacement.

S403 may be implemented by using S4031 and S4032.

S4031: Determine an effective value of third predicted displacement based on the effective value of the first predicted displacement and the effective value of the second predicted displacement.

The effective value of the third predicted displacement may be obtained based on the following formula:

$$X_{mean\_est}(t_n) = KalmanFilter[X_{mean\_ts}(t_n), X_{mean\_emf}(t_n)]$$

Herein, $X_{mean\_est}(t_n)$ represents the effective value of the third predicted displacement, and KalmanFilter represents a Kalman filter.

S4032: Determine the displacement correction gain based on the effective value of the first predicted displacement and the effective value of the third predicted displacement.

A displacement correction gain $G_c(t_n)$ is as follows:

$$G_c(t_n) = \frac{X_{mean\_est}(t_n)}{X_{mean\_ts}(t_n)}$$

S404: Determine displacement of the speaker based on the maximum value of the first predicted displacement and the displacement correction gain.

Displacement $X_{max\_ets}(t_n)$ of the speaker may be obtained based on the following formula:

$$X_{max\_est}(t_n) = G_c(t_n) \times X_{max\_ts}(t_n)$$

S405: Determine a signal control gain of the speaker based on the displacement of the speaker and a preset displacement threshold.

In this embodiment of this application, the displacement of the speaker is denoted as $X_{max\_ets}(t_n)$, the preset displacement threshold is denoted as $X_{th}$, and the signal control gain of the speaker is as follows:

$$G_p(t_n) = \begin{cases} \dfrac{X_{max\_est}(t_n)}{X_{th}}, & \text{if } X_{max\_est}(t_n) > X_{th} \\ 1, & \text{others} \end{cases}$$

S406: Perform gain control on the input signal of the speaker based on the signal control gain of the speaker, to obtain an output signal of the speaker.

Specifically, the output signal of the speaker may be obtained based on the following formula:

$$U_{out}(t_n) = G_p(t_n) \times U_{in}(t_n)$$

Optionally, in this embodiment of this application, the input signal may be further multiplied by an optimization coefficient, and the coefficient may be a coefficient related to hardware or a working state of the speaker.

In this embodiment of this application, it can be learned, with reference to S405 and S406, that when the displacement of the speaker is greater than the preset displacement threshold, the displacement of the speaker needs to be adjusted (in other words, displacement protection is enabled), so that the displacement does not exceed the preset displacement threshold, to improve a sound effect of the speaker, and improve a subjective experience of a user. Further, a parameter (which is a linear parameter) of the speaker may be identified in real time based on the feedback signal of the speaker, and a first displacement conversion model and a second displacement conversion model are updated, to resolve a problem that displacement protection fails due to a factor such as aging of a component of the speaker.

The output signal obtained in S406 is a digital signal. In this embodiment of this application, a digital-to-analog converter may be used to convert the digital signal into an analog signal, and then the output signal is transmitted, by using an amplifier, to the speaker for playing.

Further, the feedback signal of the speaker may be obtained through detection by using a feedback circuit. The feedback signal includes voltage signals and current signals (the voltage signals and the current signals are analog signals) at two ends of the speaker. Then, the voltage signals and the current signals are converted into digital voltages and digital currents by using an analog to digital converter, and then the digital voltages and the digital currents are input into the linear parameter identification model, to obtain the linear parameter (for example, P $(t_{n-1})$ in the foregoing embodiments) of the speaker.

Figure 8:
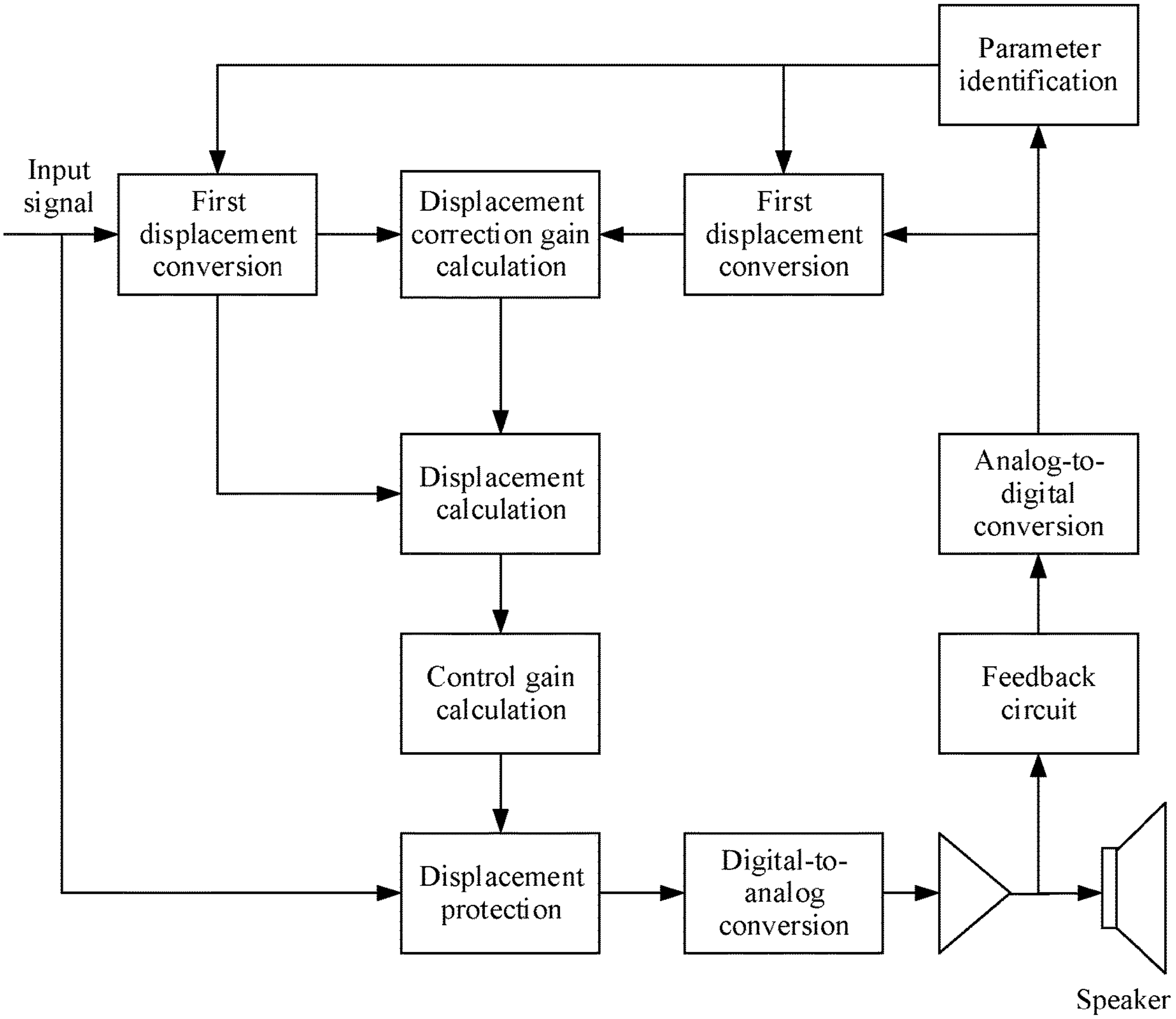
FIG. 8 is a flow block diagram 2 of a method for improving sound quality of a speaker according to an embodiment of this application.
Figure 9:
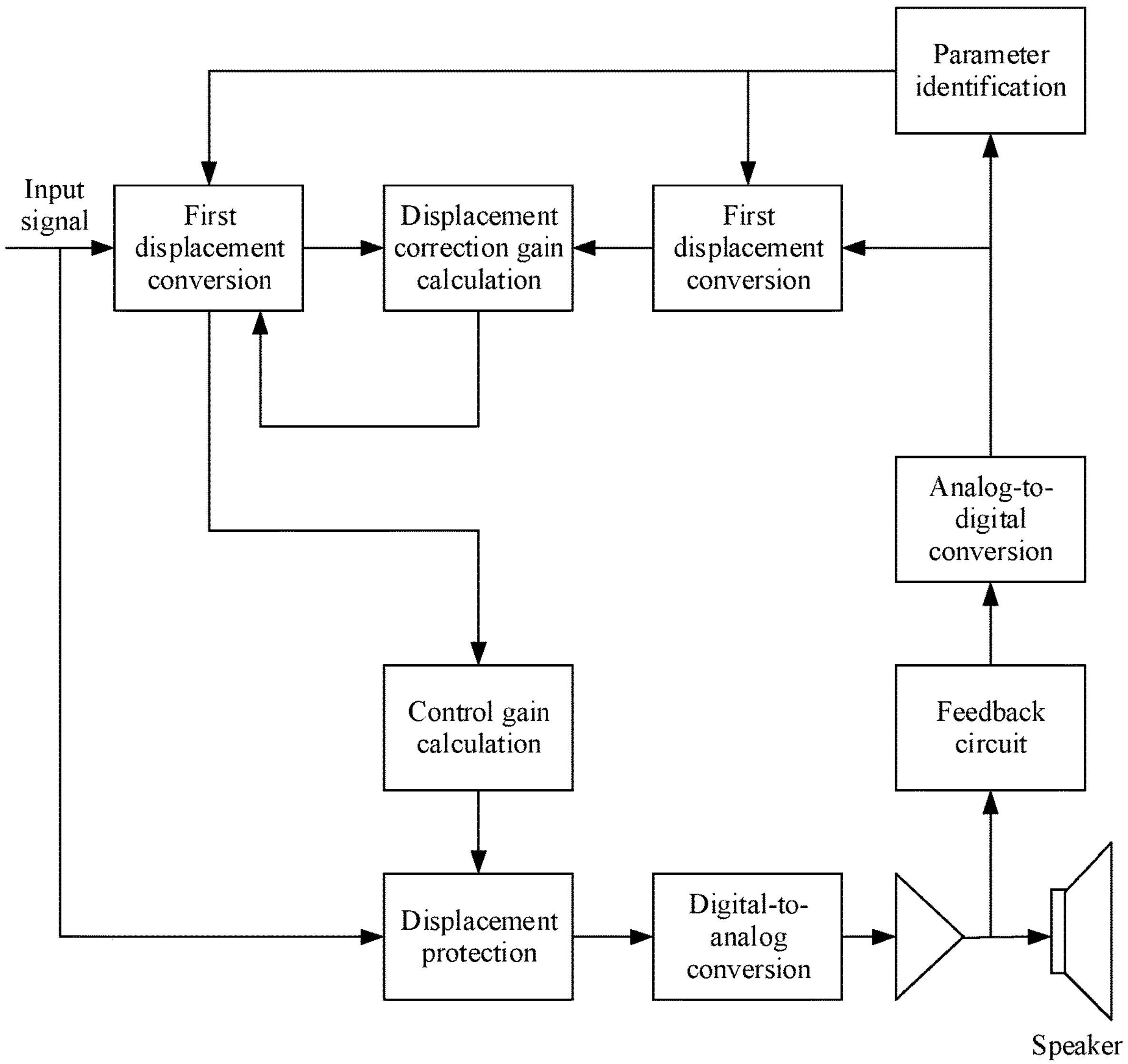
FIG. 9 is a flow block diagram 3 of a method for improving sound quality of a speaker according to an embodiment of this application.

FIG. 8 or FIG. 9 is a flow block diagram of a method for improving a sound effect of a speaker through displacement protection. A difference is as follows: In FIG. 8, the displacement correction gain is applied to the maximum value of the first predicted displacement output after first displacement conversion, to obtain the displacement of the speaker. For example, after $X_{max\_ts}(t_n)$ is obtained, the displacement of the speaker is obtained based on $X_{max\_est}(t_n)=G_c(t_n)\times X_{max\_ts}(t_n)$. In FIG. 9, the displacement correction gain is applied to a first displacement conversion process. To be specific, the displacement correction gain is directly applied to the first displacement conversion model, to obtain the displacement of the speaker. For example, $X_{max\_est}(t_n)=G_c(t_n)\times\max[H_{ux}(t_{n-1})*U_{in}(t_n)]$. Essentially, a procedure shown in FIG. 8 and a procedure shown in FIG. 9 correspond to a same method for determining displacement of a speaker.

According to the method for improving sound quality of a speaker in this embodiment of this application, first displacement conversion may be performed on the input signal of the speaker, to obtain the maximum value of the first predicted displacement and the effective value of the first predicted displacement. Second displacement conversion is performed on the feedback signal of the speaker, to obtain the effective value of the second predicted displacement. The displacement correction gain is determined based on the effective value of the first predicted displacement and the effective value of the second predicted displacement. Further, the displacement of the speaker is determined based on the maximum value of the first predicted displacement and the displacement correction gain. The signal control gain of the speaker is determined based on the displacement of the speaker and the preset displacement threshold. Gain control is performed on the input signal of the speaker based on the signal control gain of the speaker, to obtain the output signal of the speaker. In the foregoing method, the displacement of the speaker can be determined in real time, and displacement protection is performed on the speaker based on the determined displacement of the speaker (which indicates to perform gain control on the input signal of the speaker based on the signal control gain determined based on the displacement of the speaker), so that a gain of the input signal is reduced, an abrupt change in a speaker volume of the speaker is avoided, it can be ensured that the displacement of the speaker does not exceed an upper safety limit, and the sound effect of the speaker can be improved.

Optionally, in an embodiment of this application, a displacement protection method may be applied to signal compensation, to further improve a sound effect of a speaker. Specifically, an output signal obtained in the displacement protection method may be used as the first input signal. Specifically, before S101, S100*a* to S100*c* may be further included.

S100*a*: Determine displacement of the speaker.

In this embodiment of this application, the displacement of the speaker may be obtained in S401 to S404. For details, refer to related descriptions in the foregoing embodiment. Details are not described herein again.

S100*b*: Determine a signal control gain of the speaker based on the displacement of the speaker and a preset displacement threshold.

S100*c*: Perform gain control on a second input signal of the speaker based on the signal control gain of the speaker, to obtain the first input signal.

For descriptions of S100*b* and S100*c*, refer to specific descriptions of S405 and S406 in the foregoing embodiment. Details are not described herein again.

Figure 10:
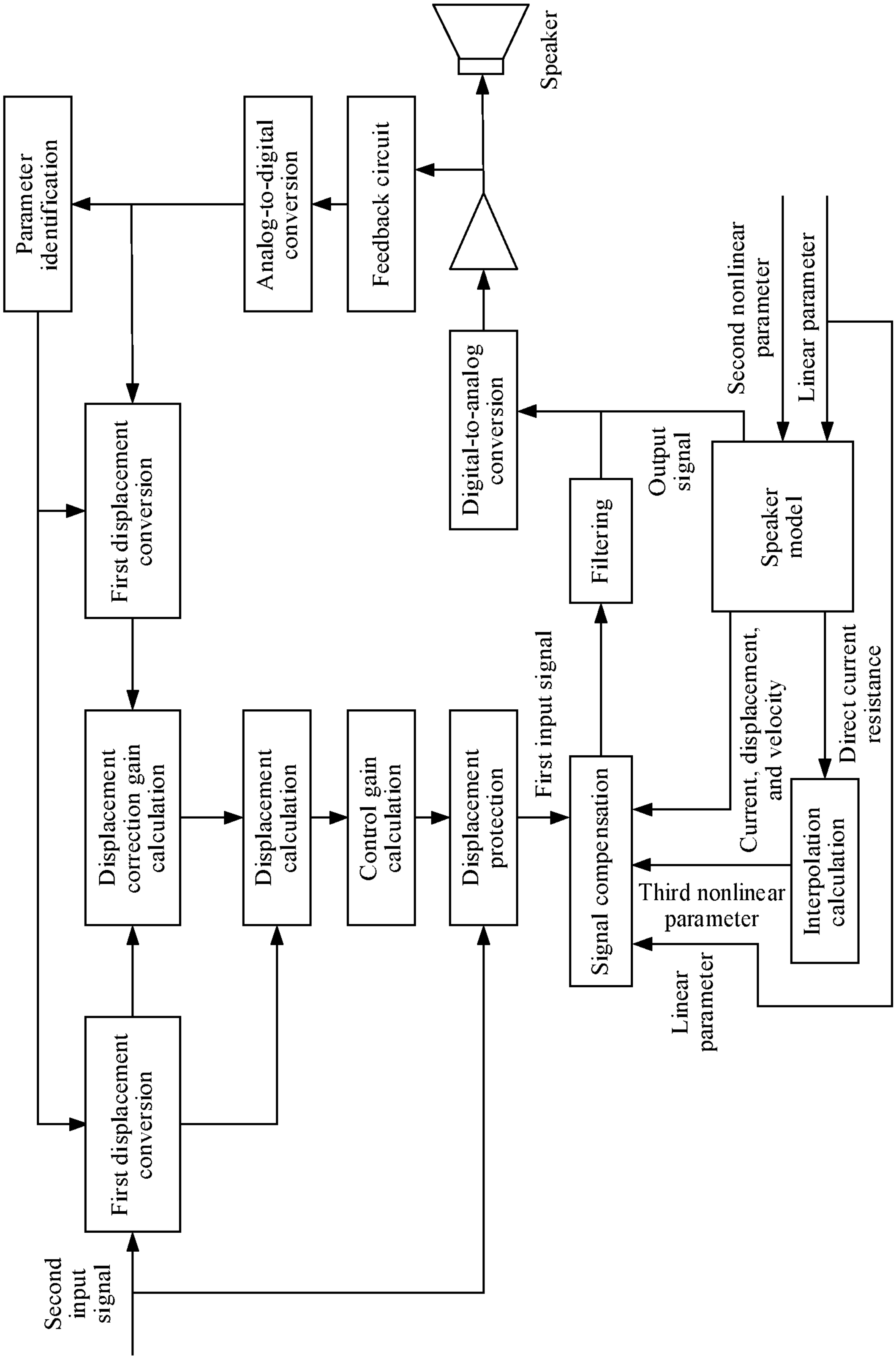
FIG. 10 is a flow block diagram 4 of a method for improving sound quality of a speaker according to an embodiment of this application.

For example, FIG. 10 is a flow block diagram of a method for applying displacement protection to signal compensation to improve a sound effect of a speaker. The foregoing method steps may be understood with reference to the flow block diagram of the method.

In this embodiment of the present disclosure, function modules of a speaker improvement apparatus may be obtained through division based on the foregoing method examples. For example, each function module may be obtained through division based on each corresponding function, or two or more functions may be integrated into one processing module. The integrated module may be implemented in a form of hardware, or may be implemented in a form of a software function module. It should be noted that division into the modules in embodiments of the present disclosure is an example, and is merely logical function division. There may be another division manner in actual implementation.

Figure 11:
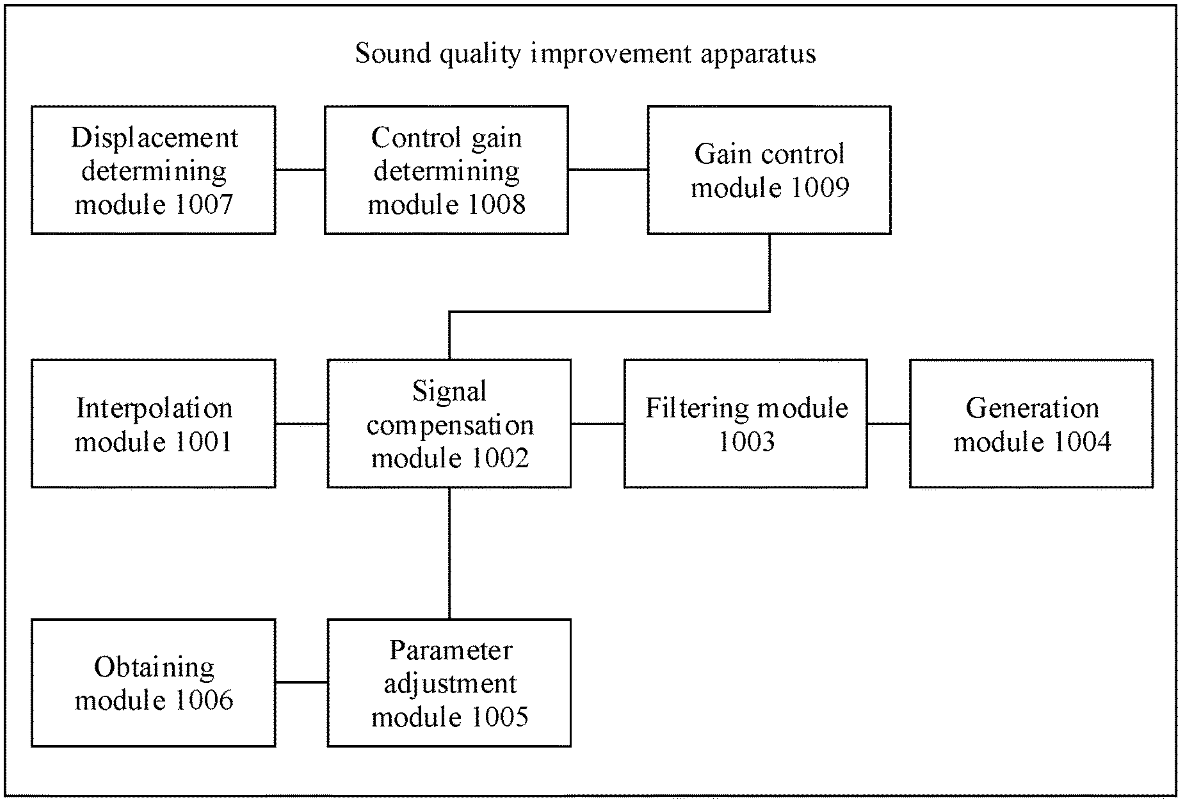
FIG. 11 is a schematic diagram 1 of a structure of a sound quality improvement apparatus according to an embodiment of this application.

When each function module is obtained through division based on each corresponding function, FIG. 11 is a schematic diagram of a possible structure of a sound quality improvement apparatus in the foregoing embodiments. As shown in FIG. 11, the sound quality improvement apparatus may include an interpolation module 1001, a signal compensation module 1002, and a filtering module 1003. The interpolation module 1001 may be configured to support the apparatus to perform S101 (including S1011 and S1012) in the foregoing method embodiments. The signal compensation module 1002 may be configured to support the apparatus to perform S102 and S204 in the foregoing method embodiments. The filtering module 1003 may be configured to support the apparatus to perform S103 in the foregoing method embodiments.

Optionally, as shown in FIG. 11, the sound quality improvement apparatus may further include a generation module 1004, a parameter adjustment module 1005, and an obtaining module 1006. The generation module 1004 may be configured to support the apparatus to generate a filtering gain. The parameter adjustment module 1005 may be configured to support the apparatus to perform S202 (including S2021 to S2023) and S203. The obtaining module 1006 may be configured to support the apparatus to perform S201. All related content of the steps in the foregoing method embodiments may be quoted to function descriptions of the corresponding function modules. Details are not described herein again.

Optionally, as shown in FIG. 11, the sound quality improvement apparatus may further include a displacement determining module 1007, a control gain determining module 1008, and a gain control module 1009. The displacement determining module 1007 may be configured to support the apparatus to perform S401 to S404 (S403 includes S4031 and S4032) and S100*a*. The control gain determining module 1008 may be configured to support the apparatus to perform S405 and S100*b*. The gain control module 1009 may be configured to support the apparatus to perform S406 and S100*c*.

Figure 12:
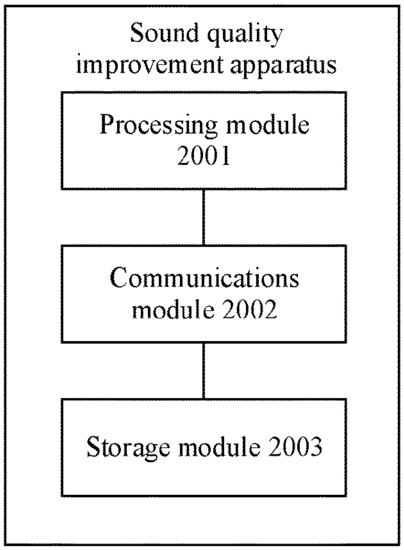
FIG. 12 is a schematic diagram 2 of a structure of a sound quality improvement apparatus according to an embodiment of this application.

When an integrated unit is used, FIG. 12 is a schematic diagram of a possible structure of an apparatus for improving sound quality of a speaker in the foregoing embodiments. As shown in FIG. 12, a sound quality improvement apparatus may include a processing module 2001 and a communications module 2002. The processing module 2001 may be configured to control and manage an action of the apparatus. For example, the processing module 2001 may be configured to support the apparatus to perform S101 to S103, S201 to S204, S301 to S305, and S401 to S406 in the foregoing method embodiments, and/or is configured to execute another process of the technology described in this specification. The communications module 2002 may be configured to support communication between the apparatus and another network entity. Optionally, as shown in FIG. 12, the apparatus may further include a storage module 2003, configured to store program code and data of the apparatus.

The processing module 2001 may be a processor or a controller (for example, the processor 110 in FIG. 1), for example, may be a central processing unit (CPU), a general purpose processor, a digital signal processor (DSP), an application-specific integrated circuit (ASIC), a field-programmable gate array (FPGA) or another programmable logic device, a transistor logic device, a hardware component, or any combination thereof. The processing module can implement or execute various example logical blocks, modules, and circuits described with reference to the content disclosed in embodiments of the present disclosure. Alternatively, the processor may be a combination for implementing a computing function, for example, a combination including one or more microprocessors or a combination of a DSP and a microprocessor. The communications module 2002 may be a transceiver, a transceiver circuit, a communications interface, or the like (for example, the mobile communications module 150 or the wireless communications module 160 in FIG. 1). The storage module 2003 may be a memory (for example, the internal memory 121 in FIG. 1).

When the processing module 2001 is the processor, the communications module 2002 is the transceiver, and the storage module 2003 is the memory, the processor, the transceiver, and the memory may be connected through a bus. The bus may be a peripheral component interconnect (peripheral component interconnect, PCI) bus, an extended industry standard architecture (extended Industry standard architecture, EISA) bus, or the like. The bus may be classified into an address bus, a data bus, a control bus, and the like.

Figure 13:
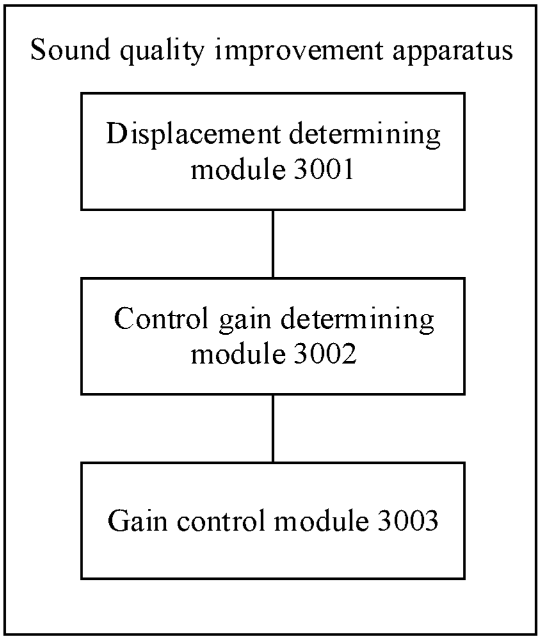
FIG. 13 is a schematic diagram 3 of a structure of a sound quality improvement apparatus according to an embodiment of this application.

When each function module is obtained through division based on each corresponding function, FIG. 13 is a schematic diagram of a possible structure of a sound quality improvement apparatus in the foregoing embodiments. As shown in FIG. 13, the sound quality improvement apparatus may include a displacement determining module 3001, a control gain determining module 3002, and a gain control module 3003. The displacement determining module 3001 may be configured to support the apparatus to perform S401 to S404 (S403 includes S4031 and S4032) and S100*a* in the foregoing method embodiments. The control gain determining module 3002 may be configured to support the apparatus to perform S405 and S100*b* in the foregoing method embodiments. The gain control module 3003 may be configured to support the apparatus to perform S406 and S100*c* in the foregoing method embodiments.

Figure 14:
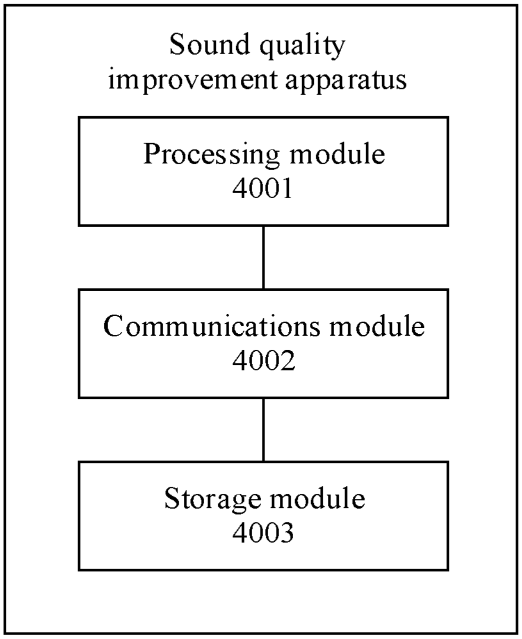
FIG. 14 is a schematic diagram 4 of a structure of a sound quality improvement apparatus according to an embodiment of this application.

When an integrated unit is used, FIG. 14 is a schematic diagram of a possible structure of a sound quality improvement apparatus in the foregoing embodiments. As shown in FIG. 14, the sound quality improvement apparatus may include a processing module 4001 and a communications module 4002. The processing module 4001 may be configured to control and manage an action of the apparatus. For example, the processing module 4001 may be configured to support the apparatus to perform S401 to S406 and S100*a* to S100*c* in the foregoing method embodiments, and/or is configured to execute another process of the technology described in this specification. The communications module 4002 may be configured to support communication between the apparatus and another network entity. Optionally, as shown in FIG. 14, the sound quality improvement apparatus may further include a storage module 4003, configured to store program code and data of the apparatus.

The processing module 4001 may be a processor or a controller (for example, may be the processor 110 shown in FIG. 1), for example, may be a CPU, a general-purpose processor, a DSP, an ASIC, an FPGA or another programmable logic device, a transistor logic device, a hardware component, or any combination thereof. The processing module can implement or execute various example logical blocks, modules, and circuits described with reference to the content disclosed in embodiments of the present disclosure. Alternatively, the processor may be a combination for implementing a computing function, for example, a combination including one or more microprocessors or a combination of a DSP and a microprocessor. The communications module 4002 may be a transceiver, a transceiver circuit, a communications interface, or the like (for example, the mobile communications module 150 or the wireless communications module 160 in FIG. 1). The storage module 4003 may be a memory (for example, the internal memory 121 in FIG. 1).

When the processing module 4001 is the processor, the communications module 4002 is the transceiver, and the storage module 4003 is the memory, the processor, the transceiver, and the memory may be connected through a bus. The bus may be a PCI bus, an EISA bus, or the like. The bus may be classified into an address bus, a data bus, a control bus, and the like.

All or some of the foregoing embodiments may be implemented by using software, hardware, firmware, or any combination thereof. When a software program is used to implement the embodiments, all or some of the embodiments may be implemented in a form of a computer program product. The computer program product includes one or more computer instructions. When the computer instructions are loaded and executed on a computer, all or some of the procedures or functions according to embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a magnetic disk, or a magnetic tape), an optical medium (for example, a digital video disc (DVD)), a semiconductor medium (for example, a solid-state drive (SSD)), or the like.

The foregoing descriptions about implementations allow a person skilled in the art to clearly understand that, for the purpose of convenient and brief description, division into the foregoing function modules is taken as an example for illustration. In actual application, the foregoing functions can be allocated to different modules and implemented according to a requirement, that is, an inner structure of an apparatus is divided into different function modules to implement all or part of the functions described above. For a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, division into the modules or units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, function units in embodiments of this application may be integrated into one processing unit, or each of the units may exist alone physically, or two or more units may be integrated into one unit. The integrated unit may be implemented in a form of hardware, or may be implemented in a form of a software function unit.

When the integrated unit is implemented in the form of a software function unit and is sold or used as an independent product, the integrated unit may be stored in a computer-readable storage medium. Based on such an understanding, the technical solutions of this application essentially, or the part contributing to the conventional technology, or all or some of the technical solutions may be implemented in a form of a software product. The computer software product is stored in a storage medium and includes several instructions for instructing a computer device (which may be a personal computer, a server, a network device, or the like) or a processor to perform all or some of the steps of the methods described in embodiments of this application. The foregoing storage medium includes: any medium that can store program code, for example, a flash memory, a removable hard disk, a read-only memory, a random access memory, a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A method for improving sound quality of a speaker, the method comprising:

performing, based on a direct current resistance of the speaker, interpolation on a first nonlinear parameter of the speaker to obtain a second nonlinear parameter of the speaker, wherein the first nonlinear parameter is preconfigured in the speaker;

performing signal compensation on a first input signal of the speaker based on the t-hifd second nonlinear parameter to obtain a compensated first input signal; and performing filtering on the compensated first input signal to obtain an output signal of the speaker.

2. The method of claim 1, wherein performing interpolation on the first nonlinear parameter comprises:

determining a temperature of a coil of the speaker based on the direct current resistance; and performing interpolation on the first nonlinear parameter based on the temperature to obtain the second nonlinear parameter.

3. The method of claim 1, further comprising generating a filtering gain, wherein the filtering gain is for performing filtering on the compensated first input signal.

4. The method of claim 1, further comprising:

determining a displacement of the speaker;

determining a signal control gain of the speaker based on the displacement and a preset displacement threshold; and performing gain control on a second input signal of the speaker based on the signal control gain to obtain the first input signal.

5. The method of claim 4, wherein determining the displacement comprises:

performing first displacement conversion on the second input signal to obtain a maximum value of a first predicted displacement and a first effective value of the first predicted displacement;

determining a displacement correction gain; and determining the displacement based on the maximum value and the displacement correction gain.

6. The method of claim 5, further comprising performing second displacement conversion on a feedback signal of the speaker to obtain a second effective value of a second predicted displacement.

7. The method of claim 6, wherein determining the displacement correction gain comprises determining the displacement correction gain based on the first effective value and the second effective value.

8. A sound quality improvement apparatus, comprising:

at least one processor; and one or more memories coupled to the at least one processor and configured to store programming instructions for execution by the at least one processor to cause the sound quality improvement apparatus to:

perform, based on a direct current resistance of a speaker, interpolation on a first nonlinear parameter of the speaker to obtain a second nonlinear parameter of the speaker, wherein the first nonlinear parameter is preconfigured in the speaker;

perform signal compensation on a first input signal of the speaker based on the second nonlinear parameter to obtain a compensated first input signal; and perform filtering on the compensated first input signal to obtain an output signal of the speaker.

9. The sound quality improvement apparatus of claim 8, wherein when executed by the at least one processor, the programming instructions further cause the sound quality improvement apparatus to:

determine a temperature of a coil of the speaker based on the direct current resistance of the speaker; and perform interpolation on the first nonlinear parameter based on the temperature to obtain the second nonlinear parameter.

10. The sound quality improvement apparatus of claim 8, wherein when executed by the at least one processor, the programming instructions further cause the sound quality improvement apparatus to generate a filtering gain, wherein the filtering gain is for performing filtering on the compensated first input signal.

11. The sound quality improvement apparatus of claim 8, wherein when executed by the at least one processor, the programming instructions further cause the sound quality improvement apparatus to:

determine a displacement of the speaker;

determine a signal control gain of the speaker based on the displacement and a preset displacement threshold; and perform gain control on a second input signal of the speaker based on the signal control gain to obtain the first input signal.

12. The sound quality improvement apparatus of claim 11, wherein when executed by the at least one processor, the programming instructions further cause the sound quality improvement apparatus to:

perform first displacement conversion on the second input signal to obtain a maximum value of a first predicted displacement and first effective value of the first predicted displacement;

determine a displacement correction gain; and determine the displacement based on the maximum value and the displacement correction gain.

13. The sound quality improvement apparatus of claim 12, wherein when executed by the at least one processor, the programming instructions further cause the sound quality improvement apparatus to perform second displacement conversion on a feedback signal of the speaker to obtain a second effective value of a second predicted displacement.

14. The sound quality improvement apparatus of claim 13, wherein when executed by the at least one processor, the programming instructions further cause the sound quality improvement apparatus to determine the displacement correction gain based on the first effective value and the second effective value.

15. A non-transitory computer-readable medium comprising instructions that, when executed by one or more processors, cause an apparatus to:

perform, based on a direct current resistance of a speaker, interpolation on a first nonlinear parameter of the speaker to obtain a second nonlinear parameter of the speaker, wherein the first nonlinear parameter is preconfigured in the speaker;

perform signal compensation on a first input signal of the speaker based on the second nonlinear parameter to obtain a compensated first input signal; and perform filtering on the compensated first input signal to obtain an output signal of the speaker.

16. The non-transitory computer-readable medium of claim 15, wherein when executed by the one or more processors, the instructions further cause the apparatus to:

determine a temperature of a coil of the speaker based on the direct current resistance; and perform interpolation on the first nonlinear parameter based on the temperature to obtain the second nonlinear parameter.

17. The non-transitory computer-readable medium of claim 15, wherein when executed by the one or more processors, the instructions further cause the apparatus to generate a filtering gain, wherein the filtering gain is for performing filtering on the compensated first input signal.

18. The non-transitory computer-readable medium of claim 15, wherein when executed by the one or more processors, the instructions further cause the apparatus to:

determine a displacement of the speaker;

determine a signal control gain of the speaker based on the displacement and a preset displacement threshold; and perform gain control on a second input signal of the speaker based on the signal control gain to obtain the first input signal.

19. The non-transitory computer-readable medium of claim 18, wherein when executed by the one or more processors, the instructions further cause the apparatus to:

perform first displacement conversion on the second input signal to obtain a maximum value of a first predicted displacement and a first effective value of the first predicted displacement;

determine a displacement correction gain; and determine the displacement based on the maximum value and the displacement correction gain.

20. The non-transitory computer-readable medium of claim 19, wherein when executed by the one or more processors, the instructions further cause the apparatus to perform second displacement conversion on a feedback signal of the speaker to obtain a second effective value of a second predicted displacement.

* * * * *